United States Patent
Hyde et al.

(10) Patent No.: US 11,361,573 B2
(45) Date of Patent: Jun. 14, 2022

(54) PHOTONIC FENCE

(71) Applicant: Tokitae LLC, Bellevue, WA (US)

(72) Inventors: Roderick A. Hyde, Redmond, WA (US); Eric Johanson, Seattle, WA (US); Jordin T. Kare, San Jose, CA (US); Artyom Makagon, Redmond, WA (US); Emma Rae Mullen, Seattle, WA (US); Nathan P. Myhrvold, Bellevue, WA (US); Thomas J. Nugent, Jr., Bellevue, WA (US); Nathan John Pegram, Seattle, WA (US); Nels R. Peterson, Bellevue, WA (US); Phillip Rutschman, Seattle, WA (US); Lowell L. Wood, Jr., Bellevue, WA (US)

(73) Assignee: TOKITAE LLC, Bellevue, WA (US)

( * ) Notice: Subject to any disclaimer, the term of this patent is extended or adjusted under 35 U.S.C. 154(b) by 557 days.

(21) Appl. No.: 16/392,933

(22) Filed: Apr. 24, 2019

(65) Prior Publication Data

US 2019/0251345 A1    Aug. 15, 2019

Related U.S. Application Data

(60) Continuation of application No. 15/825,247, filed on Nov. 29, 2017, now Pat. No. 10,311,293, which is a
(Continued)

(51) Int. Cl.
*G06V 40/10* (2022.01)
*G06T 7/20* (2017.01)
(Continued)

(52) U.S. Cl.
CPC ............. *G06V 40/10* (2022.01); *A01M 1/026* (2013.01); *A01M 1/106* (2013.01); *A01M 1/226* (2013.01); *G06T 7/20* (2013.01); *G06V 20/64* (2022.01)

(58) Field of Classification Search
CPC .. G06K 9/00362; A01M 1/106; G01M 1/226; G06T 7/20
See application file for complete search history.

(56) References Cited

U.S. PATENT DOCUMENTS

| 4,756,118 A | 7/1988 | Evans |
| 4,876,721 A | 10/1989 | Kerr et al. |

(Continued)

FOREIGN PATENT DOCUMENTS

| CN | 2410872 | 12/2000 |
| CN | 1106792 C | 4/2003 |

(Continued)

OTHER PUBLICATIONS

Australian Government, IP Australia; Examination Report No. 1, App. No. 2018253554; Aug. 13, 2019 (received by our Agent on Aug. 14, 2019); pp. 1-4.
(Continued)

*Primary Examiner* — Luke D Ratcliffe
(74) *Attorney, Agent, or Firm* — AEON Law, PLLC; Adam L. K. Philipp; Shan Liao

(57) ABSTRACT

A system for tracking airborne organisms includes an imager, a backlight source (such as a retroreflective surface) in view of the imager, and a processor configured to analyze one or more images captured by the processor to identify a biological property of an organism.

8 Claims, 7 Drawing Sheets

Related U.S. Application Data division of application No. 14/255,119, filed on Apr. 17, 2014, now Pat. No. 9,946,922, which is a continuation-in-part of application No. 12/657,281, filed on Jan. 15, 2010, now Pat. No. 8,705,017.

(60) Provisional application No. 61/205,430, filed on Jan. 15, 2009.

(51) Int. Cl.
| | |
|---|---|
| *A01M 1/02* | (2006.01) |
| *A01M 1/10* | (2006.01) |
| *A01M 1/22* | (2006.01) |
| *G06V 20/64* | (2022.01) |

(56) References Cited

U.S. PATENT DOCUMENTS

| | | |
|---|---|---|
| 5,424,551 A | 6/1995 | Callahan |
| 5,585,626 A | 12/1996 | Beck et al. |
| 6,480,266 B2 | 11/2002 | Shirai et al. |
| 6,553,042 B2 | 4/2003 | Shio et al. |
| 6,653,971 B1 | 11/2003 | Guice et al. |
| 6,853,328 B1 | 2/2005 | Guice et al. |
| 8,400,348 B1 | 3/2013 | Guice et al. |
| 2001/0053162 A1 | 12/2001 | Shio et al. |
| 2003/0218543 A1 | 11/2003 | Gardner et al. |
| 2004/0093190 A1 | 5/2004 | Beroza et al. |
| 2005/0025357 A1* | 2/2005 | Landwehr ............ A01M 1/026 382/170 |
| 2006/0150473 A1 | 7/2006 | Bette |
| 2006/0181493 A1 | 8/2006 | Satoh |
| 2006/0215885 A1 | 9/2006 | Kates |
| 2006/0254522 A1 | 11/2006 | Shaw et al. |
| 2007/0157323 A1 | 7/2007 | Carlson et al. |
| 2007/0183631 A1 | 8/2007 | Zhang et al. |
| 2008/0100825 A1 | 5/2008 | Zalewski |
| 2008/0200866 A1 | 8/2008 | Prisco et al. |
| 2009/0167651 A1* | 7/2009 | Minano ................ G02B 6/0048 345/84 |
| 2010/0063744 A1 | 3/2010 | Golombek et al. |
| 2011/0101252 A1 | 5/2011 | Rubochkin |
| 2011/0285910 A1 | 11/2011 | Bamji et al. |

FOREIGN PATENT DOCUMENTS

| | | | |
|---|---|---|---|
| CN | 1821848 A | | 8/2006 |
| CN | 101170901 A | | 4/2008 |
| CN | 102340988 A | | 2/2012 |
| JP | 2003168181 A | * | 6/2003 |
| RU | 2391818 C2 | | 6/2010 |
| WO | 03084319 A1 | | 10/2003 |
| WO | 2006101654 A2 | | 9/2006 |
| WO | 2010083053 A1 | | 7/2010 |

OTHER PUBLICATIONS

Chinese State Intellectual Property Office, Notification of the First Office Action, App. No. 201580023177.6 (based on PCT App. No. PCT/US2015/025981); dated May 30, 2019 (received by our Agent on Jun. 6, 2019); pp. 1-6 (machine translation provided).
European Patent Office, Supplementary European Search Report, Pursuant to Rule 62 EPC; App. No. EP 15780641.5; dated Nov. 23, 2017 (received by our Agent on Nov. 29, 2017); pp. 1-9.
U.S. Appl. No. 12/657,281, filed Jan. 15, 2010.
PCT International Search Report; International App. Np. PCT/US2015/025981 ; dated Jun. 29, 2015.
Foster, Woodbridge A. et al.; "Nectar-Related Olfactory and Visual Attractants for Mosquitoes"; Journal of the American Mosquito Control Association; Jun. 1994; pp. 288-296; vol. 10, No. 2: American Mosquito Control Association, Inc.
Acar, E. B. et al.; "Calorespirometric Determination of the Effects of Temperature on Metabolism of Harmonia axyridis (Col: Coccinellidae) from Second Instars to Adults": Physiological Ecology; Bearing a date of 2004; pp. 832-838; vol. 33, No. 4; Entomological Society of America.
Acar, E. B. et al.; "Use of Calorespirometry to Determine Effects of Temperature on Metabolic Efficiency an insect": Environmental Entomology; Bearing a date of 2001; pp. 811-816; vol. 30, No. 5; Entomological Society of America.
Belisle, Jonathan M. et al.; "Sensitive Detection of Malaria Infection by Third Harmonic Generation Imaging"; Biophysical Journal: Biophysical Letters; Received for publication Nov. 7, 2007 and in final form Nov. 30, 2007 ; pp. L26-L28 (3 pages total); Biophysical Society.
Benedict, Mark Q.; "Chapter One, Care and maintenance of anopheline mosquito colonies"; The Molecular Biology of Insect Disease Vectors, A Methods Manual: Bearing a date of 1997; pp. 3-12; First edition; Chapman & Hall; London, UK.
Braks, M. A. H. et al.; "The response of the malaria mosquito, Anopheles gambiae, to two components of human sweat, ammonia and L-lactic acid, in an olfactometer"; Physiological Entomology; Bearing a date of 2001 ; pp. 142-148; vol. 26; Blackwell Science Ltd.
Cator, Lauren J. et al.; "Do malaria parasites manipulate mosquitos? "; Trends in Parasitology; Nov. 2012; pp. 466-470; vol. 28, Issue 11; Elsevier Ltd.
Cator, Lauren J. et al.; "Harmonic Convergence in the Love Songs of the Dengue Vector Mosquito"; Science Express; Bearing a date of Jan. 8, 2009; pp. 1-6.
Charlwood, J.D. et al.; "The swarming and mating behaviour of Anopheles gambiae s.s. (Diptera: Cullcidae) from Sao Tome Island"; Journal of Vector Ecology; Bearing dates of Nov. 5, 2001, Jan. 16, 2002 and Dec. 2002; pp. 178-183.
Chen, Yanping et al.; "Flying Insect Classification with Inexpensive Sensors"; Cornell University Library: Submitted on Mar. 11, 2014; pp. 1-45 (including two information pages); located at http://arxiv.org/ftp/arxiv/papers/1403/1403.2854.pdf.
Chinese State Intellectual Property Office, Office Action, App. No. 2010800105510.7 (Based on US Patent Application No. PCT/US2010/000111); dated Nov. 26, 2012; pp. 1-22; (no translation provided).
Dekker, T. et al.; "L-lactic acid: a human-signifying host cue for the anthropephilic mosquito Anopheles gambiae"; Medical and Veterinary Entomology; Bearing a date of 2002; pp. 91-98; vol. 16; The Royal Entomological Soceity.
Emami, S.N. et al; "Morphological method for sexing anopheline larvae"; Journal of Vector Borne Diseases; Bearing a date of Dec. 2007; pp. 245-249; vol. 44.
Geier, Martin et al.; "A new Y-tube olfactometer for mosquitoes to measure the attractiveness of host odours"; Entomologia Experimentallis et Applicata; Bearing a date of Mar. 9, 1999; pp. 9-19; vol. 92; Kluwer Academic Publishers.
Ghaninia, Majid et al.; "Functional classification and central nervous projections of olfactory receptor neurons housed in antennal trichoid sensilla of female yellow fever mosquitoes, Aedes aegypli"; European Journal of Neuroscience; Bearing dates of Mar. 23, 2007, Jul. 20, 2007 and Jul. 26, 2007; pp. 1611-1623; Federation of European Neuroscience Societies and Blackwell Publishing Ltd.
Gibson, Gabriella et al.; "Flying in Tune: Sexual Recognition in Mosquitoes"; Current Biology; Bearing a date of Jul. 11, 2006; pp. 1311-1316; vol. 16; Elsevier Ltd.
Gladwell, Malcolm; "Annals of Innovation: In the Air: Who says big ideas are rare?"; The New Yorker; bearing a date of May 12, 2008; printed on Jan. 15, 2009; pp. 1-6; located at http://www.newyorker.com/reporting/2008/05/12/080512fa_fact_gladwell.
Gopfert, Martin C. et al.; "Nanometre-range acoustic sensitivity in male and female mosquitoes", Proceedings of the Royal Society of London B: Bearing dates of Oct. 22, 1999, Dec. 6, 1999 and 2000; pp. 453-457; vol. 267, The Royal Society.
Hoy, Ron; "A boost for hearing in mosquitoes"; PNAS: Bearing a date of Nov. 7, 2006: pp. 16619-16620: vol. 103, No. 45; The National Academy of Sciences of the USA.
Huang, Juan et al.; "Daily temperature profiles in and around Western Kenyan larval habitats of Anopheles gambiae as related to

(56) References Cited

OTHER PUBLICATIONS egg mortality"; Malaria Journal: Bearing dates of Jun. 6, 2006 and Oct. 12, 2006; pp. 1-9; vol. 5, No. 87; BioMed Central.
Intellectual Ventures: "Dancing Asian Citrus Psyllids"; YouTube Video; Uploaded on Mar. 2, 2011 and printed on Apr. 2, 2014; pp. 1-2; located at https://www.youtube.com/watch?v=fMu8nl_8Ozg.
Johanson, 3. et al.; "Using Novel Photonic Fence Technolog to Protect Foundation Block and Nursery Stock from Asian Citrus Psyllid"; Poster presentation at the 2nd Int'l Research Conf. on Huanglongbing, Orlando, FL; Jan. 2011; pp. 1-2.
Lacroix, Renaud et al.; "Malaria Infection Increases Attractiveness of Humans to Mosquitoes"; PLOS Biology; Sep. 2005; pp. 1590-1593; vol. 3, Issue 9.
Miller, James R. et al.; "Finding and Accepting Host Plants"; Chemical Ecology of Insects; Bearing a date of 1994; pp. 127-157; Chapman and Hall Ltd.
Moore, Aubrey; "Artificial Neural Network Trained to Identify Mosquitoes in Flight"; Journal of Insect Behavior; bearing a date of 1991; pp. 391-396; vol. 4, No. 3; Plenum Publishing Corporation.
Nasa Tech Briefs; "An Automated Flying-Insect Detection System"; Bearing a date of Sep. 1, 2007; Printed on Jan. 21, 2010; pp. 1-2; located at http:/www.techbriefs.com/content/view/2187/34/.
Nathan, Dr. Michael B. et al.: "Dengue Guidelines for Diagnosis, Treatment, Prevention and Control"; 2009; pp. 1-147 (160 pages total); ISBN 978 92 4 154767 1; World Health Organization (WHO) and the Special Programme for Research and Training in Tropical Diseases (TDR).
Patent Auction.com; "Method of protection from biting insects"; Printed on Apr. 6, 2011; pp. 1-2; located at http://www.patentauction.com/patent.php?nb=6549.
PCT International Search Report; International App. No. PCT/US 10/00111; bearing a date of May 25, 2010; pp. 1-5.
"Phaton Flex—Data Sheet"; Vision Research, Inc.; Revised Oct. 2013; pp. 1-4; located at http://www.visionresearch.com/uploads/Docs/Products/DS-WEB_Flex.pdf.
Pitts, R Jason et al.; "Antennal sensilla of two female anopheline sibling species with differing host ranges"; Malaria Journal: Bearing dates of Feb. 15, 2006 and Mar. 30, 2006; pp. 1-12; vol. 5, No. 26; BioMed Central.
Polson, Karen A. et al.; "The Use of Ovitraps Baited with Hay Infusion as a Surveillance Tool for Aedes aegypti Mosquitoes in Cambodia"; Dengue Bulletin; Dec. 2002; pp. 178-184; vol. 26.
Puri, Sarika N. et al.; "Electroantennogram and Behavioral Responses of Culex quinquefasciatus (Diptera: Culicidae) Females to Chemicals Found in Human Skin Emanations"; Journal of Medical Entornology; Bearing a date of Mar. 2006; pp. 207-213; vol. 43, No. 2; Entornological Society of America.
Regis, Leda N et al.; "Sustained Reduction of the Dengue Vector Population Resulting from an integrated Control Strategy Applied in Two Brazilian Cities"; PLOS ONE; Jul. 2013; pp. 1-12; vol. 8, Issue 7: Regis et al.
Robertsosn et al.; "Heritability of Wing-Beat Frequency in Anopheles Quadrimaculatus"; Journal of the American Mosquito Control Association; bearing a date of 2002; pp. 316-320; vol. 18, No. 4; The American Mosquito Control Assocation, Inc.
Russell B. M. et al.; "Calibrated Funnel Trap for Quantifying Mosquito (Diptera: Culicidae) Abundance in Wells"; Journal of Medical Entomology; 1999; pp. 851-855; vol. 36, No. 6; Entomological Society of America.
Schreck, C.E. et al.; "Mosquito Attraction to Substances from the Skin of Different Humans"; Journal of the American Mosquito Control Association; Bearing a date of Sep. 1990; pp. 406-410; vol. 6, No. 3.
Sikaala, Chadwick H. et al.; "Evaluation of alternative mosquito sampling methods for malaria vectors in Lowland South—East Zambia"; Parasites & Vectors; 2013: pp. 1-11; vol. 6, No. 91; BioMed Central Ltd.
Smallegange, Renate C. et al.; "Malaria Infected Mosquitoes Express Enhanced Attraction to Human Odor"; PLOS ONE; May 2013; pp. 1-3; vol. 8, Issue 5; Smallegange et al.
Smith et al.; "The use of vertical-looking radar to continuously monitor the insect fauna flying at altitude over southern England"; Bulletin of Entomological Research; bearing a date of 2000; pp. 265-277; vol. 90; CAB International, 2000.
Soumare, M.L. et al.; "Ultrastructual studies of mosquito ovogenesis"; Tissue and Cell; Bearing dates of Dec. 19, 2003, Nov. 8, 2004 and Nov. 9, 2004; pp. 117-124; vol. 37; Elsevier Ltd.
Spitzen et al.; "Track3D: Visualization and flight track analysis of Anopheies gambiae s.s. mosquitoes"; Proceedings of Measuring Behavior 2008; bearing dates of Aug. 26-29, 2008; pp. 133-135.
Sutcliffe, James F.; "Distance Orientation of Biting Flies to Their Hosts"; Insect Science Applicationsl Bearing a date of Jun. 22, 1987; pp. 611-616; vol. 8, Nos. 4, 5, and 6; ICIPE—ICIPE Science Press.
Takken, Willem et al.; "Mosquito mating behaviour"; Bridging laboratory and field research for genetic control of disease vectors; pp. 183-188; Springer, Netherlands.
Vu, Nick; "Make's 'Mosquito Blaster' Article"; Intellectual Ventures Lab; Published Sep. 8, 2010, Printed on Apr. 16, 2014; pp. 1-4; located at http://intellectualventureslab.com/?p=1574.
Yuval, Boaz et al.; "Energy budget of swarming mate mosquitoes"; Ecological Entomology; Bearing a date of 1994; pp. 74-78; vol. 19.
U.S. Appl. No. 13/004,943, filed Jan. 12, 2011.
U.S. Appl. No. 14/255,119, filed Apr. 17, 2014.
U.S. Appl. No. 15/825,247, filed Nov. 29, 2017.
U.S. Appl. No. 61/205,430, filed Jan. 15, 2009.

\* cited by examiner

PHOTONIC FENCE

If an Application Data Sheet (ADS) has been filed on the filing date of this application, it is incorporated by reference herein. Any applications claimed on the ADS for priority under 35 U.S.C. § § 119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The present application claims the benefit of the earliest available effective filing date(s) from the following listed application(s) (the "Priority Applications"), if any, listed below (e.g., claims earliest available priority dates for other than provisional patent applications or claims benefits under 35 USC § 119(e) for provisional patent applications, for any and all parent, grandparent, great-grandparent, etc. applications of the Priority Application(s)).

PRIORITY APPLICATIONS

The present application constitutes a continuation of U.S. patent application Ser. No. 15/825,247, entitled PHOTONIC FENCE, naming Roderick A. Hyde, Eric Johanson, Jordin T. Kare, Artyom Makagon, Emma Rae Mullen, Nathan P. Myhrvold, Thomas J. Nugent, Jr., Nathan John Pegram, Nels R. Peterson, Phillip Rutschman, Lowell L. Wood, Jr. as inventors, filed Nov. 29, 2017, which is currently co-pending or is an application of which a currently co-pending application is entitled to the benefit of the filing date, and which constitutes a divisional of U.S. patent application Ser. No. 14/255,119, entitled PHOTONIC FENCE, naming Roderick A. Hyde, Eric Johanson, Jordin T. Kare, Artyom Makagon, Emma Rae Mullen, Nathan P. Myhrvold, Thomas J. Nugent, Jr., Nathan John Pegram, Nels R. Peterson, Phillip Rutschman, Lowell L. Wood, Jr. as inventors, filed Apr. 17, 2014, which is currently co-pending or is an application of which a currently co-pending application is entitled to the benefit of the filing date, and which constitutes a continuation-in-part of U.S. patent application Ser. No. 12/657,281, entitled PHOTONIC FENCE, naming Roderick A. Hyde, Eric Johanson, Jordin T. Kare, Nathan P. Myhrvold, Thomas J. Nugent, Jr., Nels R. Peterson, Lowell L. Wood, Jr. as inventors, filed Jan. 15, 2010, which is currently co-pending or is an application of which a currently co-pending application is entitled to the benefit of the filing date, and which claims benefit of priority of U.S. Provisional Patent Application No. 61/205,430, entitled PHOTONIC FENCE, naming Roderick A. Hyde, Eric Johanson, Jordin T. Kare, Nathan P. Myhrvold, Thomas J. Nugent, Jr., Nels R. Peterson, Lowell L. Wood Jr. as inventors, filed Jan. 15, 2009.

If the listings of applications provided above are inconsistent with the listings provided via an ADS, it is the intent of the Applicant to claim priority to each application that appears in the Domestic Benefit/National Stage Information section of the ADS and to each application that appears in the Priority Applications section of this application.

All subject matter of the Priority Applications and of any and all applications related to the Priority Applications by priority claims (directly or indirectly), including any priority claims made and subject matter incorporated by reference therein as of the filing date of the instant application, is incorporated herein by reference to the extent such subject matter is not inconsistent herewith.

SUMMARY

In one aspect, a system for tracking airborne organisms includes an imager (e.g., a camera or scanner), a backlight source (e.g., a retroreflector), and a processor. The processor is configured to analyze one or more images captured by the imager including at least a portion of the backlight source and to identify a biological property (e.g., genus, species, sex, mating status, gravidity, feeding status, age, or health status) of an organism (e.g., an insect, such as a mosquito, a bee, a locust, or a moth) in the field of view of the imager, using characteristic frequency, harmonic amplitude, shape, size, airspeed, ground speed, or location. The system may further include an illumination light source arranged to illuminate the field of view of the imager. The organism may have wings, in which case the processor may be configured to identify the biological property using a wingbeat frequency.

The system may further include a detector configured to detect a signal indicative of a property of an organism in the field of view of the imager. For example, the detector may include a photodiode, which may be configured to detect light from an optional targeting light source configured to be directed at the organism, or light from the backlight source. The targeting light source may be configured to be directed at the organism from a plurality of directions (e.g., a group of spotlights or LEDs which may be placed at positions surrounding an expected organism location). The detector may be configured to detect a signal indicative of a distance from the imager to the organism, for example by detecting shadows cast by the organism in a plurality of targeting light sources (which may, for example, be different colors or be configured to be selectively switched on and off), or by using a plurality of optical position sensing devices to triangulate the organism. The processor (or a second processor) may be configured to use this signal to determine a distance from the imager to the organism. Alternatively, the processor may use one or more images captured by the imager to determine the distance to the organism, for example in cases where the imager includes a plurality of imaging devices, which may function in the same ways as the targeting light sources described above. The detector may have a bandwidth greater than one-half of a frame rate of the imager, or less than or equal to a frame rate of the imager, and may have an image resolution or field of view greater or smaller than that of the imager. The detector may also be acoustic.

In another aspect, a method of tracking airborne organisms includes acquiring a first image from an imager, the imager having a backlight source (e.g., a retroreflector) in its field of view, determining that the image includes an organism at a location, acquiring a second image, and determining a biological property (e.g., genus, species, sex, mating status, gravidity, feeding status, age, or health status) of the organism using the second image (e.g., by determining characteristic frequency, harmonic amplitude, shape, size, airspeed, ground speed, flight direction, flight path, or location). The first and second images have different resolutions (e.g., the first image may be finer or coarser than the second image), or they are acquired at different frame rates (e.g., the second image may be acquired at a faster or slower frame rate than the first). The images may also differ in size.

Acquiring the first or second image may include illuminating the region of the acquired image, for example with a laser or an LED. Acquiring either image may include acquiring a series of images. The images may both be acquired by the imager, or the second image may be acquired by a different device (e.g., a photodiode).

In another aspect, a system for disabling airborne organisms includes an imager (e.g., a camera or scanner), a backlight source (e.g., a retroreflector), a processor, and a disabling system. The processor is configured to analyze one or more images captured by the imager including at least a portion of the backlight source and to identify a biological property (e.g., genus, species, sex, mating status, gravidity, feeding status, age, or health status) of an organism (e.g., an insect, such as a mosquito, a bee, a locust, or a moth) in the field of view of the imager, using characteristic frequency, harmonic amplitude, shape, size, airspeed, ground speed, or location. The disabling system is configured to disable the organism (e.g., by killing, damaging a wing or antenna, or impairing a biological function) responsive to the identified property (e.g., only disabling organisms of a determined genus, species, sex, or gravidity). The disabling system may include a laser (e.g., a UV-C laser or an infrared laser), and may be configured to accept location data from the processor for use in targeting the organism.

In another aspect, a method of disabling airborne organisms includes acquiring a first image from an imager, the imager having a backlight source (e.g., a retroreflector) in its field of view, determining that the image includes an organism at a location, acquiring a second image, determining a biological property (e.g., genus, species, sex, mating status, gravidity, feeding status, age, or health status) of the organism using the second image (e.g., by determining characteristic frequency, harmonic amplitude, shape, size, airspeed, ground speed, flight direction, flight path, or location), and disabling the organism responsive to the determined biological property (e.g., killing the organism or impairing a body function such as mating, feeding, flying, hearing, acoustic sensing, chemosensing, or seeing). The first and second images have different resolutions (e.g., the first image may be finer or coarser than the second image), or they are acquired at different frame rates (e.g., the second image may be acquired at a faster or slower frame rate than the first). The organism may be disabled, for example, by directing a laser beam at the organism (optionally using targeting information obtained from one or both of the acquired images), by directing an acoustic pulse at the organism, by releasing a chemical agent, or by directing a physical countermeasure at the organism.

In another aspect, a system for identifying status of flying insects in a region includes an imager, a backlight source (e.g., a retroreflector) configured to be placed in the field of view of the imager, and a processor configured to analyze one or more images captured by the imager including at least a portion of the backlight source, the processor being configured to identify probable biological status of an insect in the field of view of the imager using characteristic frequency, shape, size, airspeed, ground speed, or location. The insect may be a mosquito, in which case the processor may be configured to determine a probability that the mosquito is infected with malaria. The processor may be configured to gather probable biological status of a plurality of insects, for example gathering population data for a population of insects, or gathering probable biological status data as a function of an environmental parameter (e.g., time of day, season, weather, or temperature).

In another aspect, a system for tracking airborne organisms includes an imager, a backlight source (e.g., a retroreflector) configured to be placed in the field of view of the imager, a processor, and a detector configured to detect an organism in the field of view of the imager. At least one of the imager and the detector is configured to collect color data. The processor is configured to analyze one or more images captured by the imager including at least a portion of the backlight source, and to identify a biological property of an organism in the field of view of the imager using at least one datum selected from the group consisting of characteristic frequency, harmonic amplitude, shape, size, airspeed, ground speed, and location. The system may use the collected color data to determine a probable engorgement status of the organism (e.g., a mosquito engorged with blood). The system may further include a forward-facing light source configured to illuminate the organism, for example when it is in the field of view of the imager or of the detector. The detector may include a photodiode (e.g., a quad cell photodiode). The system may further include a targeting light source configured to be directed at the organism from one or more directions, in which case the photodiode may be configured to detect light reflected from the organism or light from the backlight source. The detector may be configured to detect a signal indicative of a distance from the imager to the organism. The processor (or a second processor) may be configure to determine a distance from the imager to the organism using the signal detected by the detector. The processor may be configured to determine a distance from the imager to the organism by using the signal detected by the detector. The system may include a plurality of targeting light sources in differing positions (e.g., different colored light sources), so that the detector may detect shadows cast by the organism in each light source. These targeting light sources may be configured to be selectively switched on and off. The detector may include a plurality of optical position sensing devices configured to provide range information by triangulation of the organism. The detector may have a bandwidth greater than one-half the frame rate of the imager, or of less than or equal to the frame rate of the imager, and may have an image resolution that is less than or greater than the image resolution of the imager. The processor may be configured to identify genus, species, sex, age, mating status, gravidity, feeding status, or health status of the organism. The system may further include a disabling system responsive to the identified property configured to disable the organism.

In another aspect, a method of tracking airborne organisms includes acquiring a first image (e.g., a monochrome or a color image) having a first image resolution from an imager with a backlight source (e.g., a retroreflector) in its field of view, determining that the image includes an organism at a location, acquiring a second image having a second image resolution and including color data (e.g., with a photodiode such as a quad cell photodiode or with an imager), and determining a biological property of the organism (e.g., genus, species, sex, mating status, gravidity, feeding status, age, or health status) using at least the second image, where the first and second images differ in resolution or frame rate, or the second image includes color data not included in the first image. Determining the biological property (e.g., engorgement status) may include using the color data, and may include determining characteristic frequency, harmonic amplitude, shape, size, airspeed, ground speed, flight direction, flight path, or location.

In another aspect, a system for tracking airborne organisms includes an imager, a backlight source (e.g., a retroreflector) configured to be placed in the field of view of the imager, and a processor configured to analyze one or more images captured by the imager, the processor being configured to identify a rotation of an organism in the field of view of the imager. The processor may be configured to determine a revolution rate of the organism, and may further be configured to determine a wingbeat frequency of an organism that has wings. The system may further include a detector (e.g., a photodiode such as a quad cell photodiode) configured to detect a signal indicative of a property of an organisms in the field of view of the imager. The system may further include a targeting light source (from one or more directions), and the photodiode may be configured to detect light from the light source reflected from the organism or light from the backlight source. The detector may be configured to detect a signal indicative of a distance from the imager to the organism, for example to be determined by the processor or by a second processor. The system may include a plurality of targeting light sources at differing positions, where the detector is configured to detect shadows cast by the organism in each light source, or the detector may include a plurality of optical position sensing devices configured to provide range information by triangulation of the organism. The detector may have a bandwidth greater than about one-half of a frame rate of the imager, or of less than or about equal to a frame rate of the imager, and may have an image resolution less than or greater than the image resolution of the imager. The processor may be configured to identify a biological property of the organism selected from the group consisting of genus, species, sex, mating status, gravidity, feeding status, age, and health status. The system may further include a disabling system configured to disable the organism.

In another aspect, a method of tracking airborne organisms includes acquiring a first image from an imager having a backlight source (e.g., a retroreflector) in its field of view, determining at the image includes an organism at a location, and determining that the organism is rotating about a revolution axis. The method may further include determining a revolution rate or revolution axis for the organisms, or determining a wingbeat frequency for an organism with wings. It may include determining a biological property of the organism (e.g., genus, species, sex, mating status, gravidity, feeding status, age, or health status), which may include determining a datum selected from the group consisting of characteristic frequency, harmonic amplitude, shape, size, airspeed, ground speed, flight direction, flight path, and location, and may include responding to the determined biological property by disabling the organism. The method may further include detecting a signal indicative of a distance from the imager to the organism.

In another aspect, a system for tracking organisms includes an imager, a backlight source (e.g., a retroreflector) configured to be placed in the field of view of the imager, a processing configured to analyze one or more images captured by the imager and to identify a biological property (e.g., genus, species, sex, mating status, gravidity, feeding status, age, or health status) of an airborne organism (e.g., an insect such as a mosquito or a psyllid) in the field of view of the imager, and a physical trap configured to physically capture at least one organism (e.g., a flying organism, or an immature individual of a species that is capable of flight at maturity), wherein the system is configured to use the identified biological property to measure an efficacy of the physical trap. Measuring the efficacy of the physical trap may include comparing a number of organisms in the trap with a number of airborne organisms identified by the processor (e.g., during the same time interval or during a different time interval). The field of view of the imager may include at least a portion of the trap interior, or it may include a volume exterior to the trap.

In another aspect, a method of determining efficacy of a trap for airborne organisms includes monitoring a population of airborne organisms to determine a population in a monitored space by acquiring an image from an imager having a field of view including the monitored space and a backlight (e.g., a retroreflector), determining that the image includes an organism (e.g., an insect such as a mosquito or a psyllid), and determining a biological property of the organism (e.g., genus, species, sex, mating status, gravidity, feeding status, age, or health status), determining a number of airborne organisms captured by a trap, and comparing the number of captured organisms with the determined population of airborne organisms. Comparing the number of captured organisms with the determined population of organisms may include comparing only organisms having a selected biological property, or comparing a fraction of organisms having a selected biological property. The trap may be configured to capture flying organisms, or immature individuals of a species that is capable of flight at maturity.

In another aspect, a system for tracking airborne organisms includes a physical trap configured to capture at least one airborne organism (e.g., an insect such as a mosquito or a psyllid), a detection component configured to identify a biological property (e.g., genus, species, sex, mating status, gravidity, feeding status, age, or health status) of the captured organism, the detection component including an imager, a backlight source (e.g., a retroreflector) configured to be placed in the field of view of the imager, and a processor configured to analyze one or more detected images to identify the biological property, and a notification component configured to send a notification to a remote user in response to the identified property.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
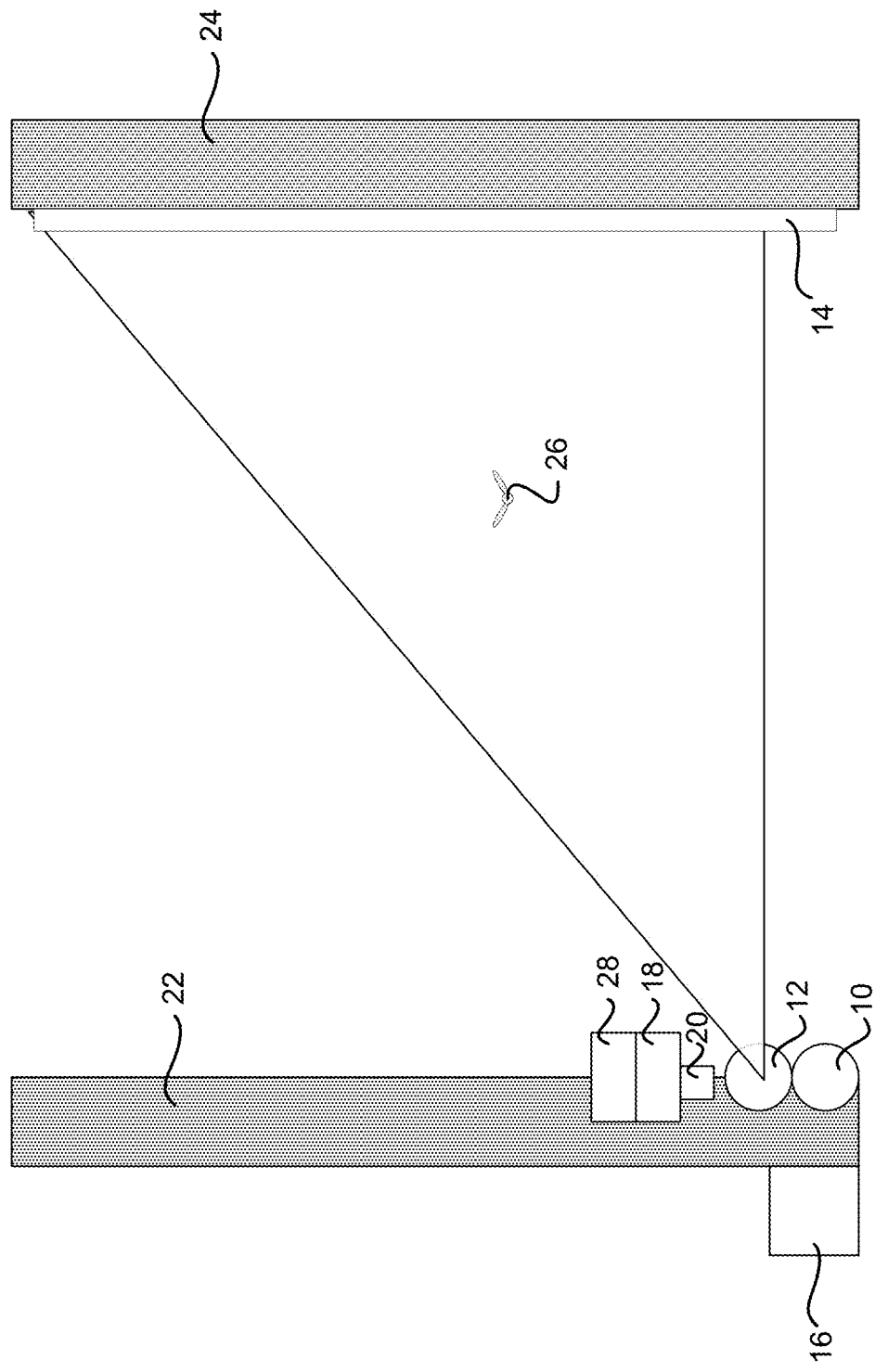
FIG. 1 is a schematic of a detection system.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

As shown in FIG. 1, a system for locating or identifying information about, or optionally disabling insects or other organisms includes an imager 10, illumination source 12, a retroreflective surface 14, a processor 16 configured to analyze images captured by the imager 10, a targeting laser 18, and a photodiode 20. In the illustrated embodiment, imager 10 is a CMOS camera placed at the base of support post 22, but a variety of other imagers may be appropriate. For example, CCD-based detectors, scanning systems, or other types of detectors may be implemented. Moreover, in some approaches two or more imagers may be placed on support post 22 or on other supports. In some embodiments, retroreflective surface 14 may be replaced with a light emitting surface (backlight), for example a substantially uniform light emitting surface with a desired angular distribution at light, which may be aimed toward imager 10.

Figure 2:
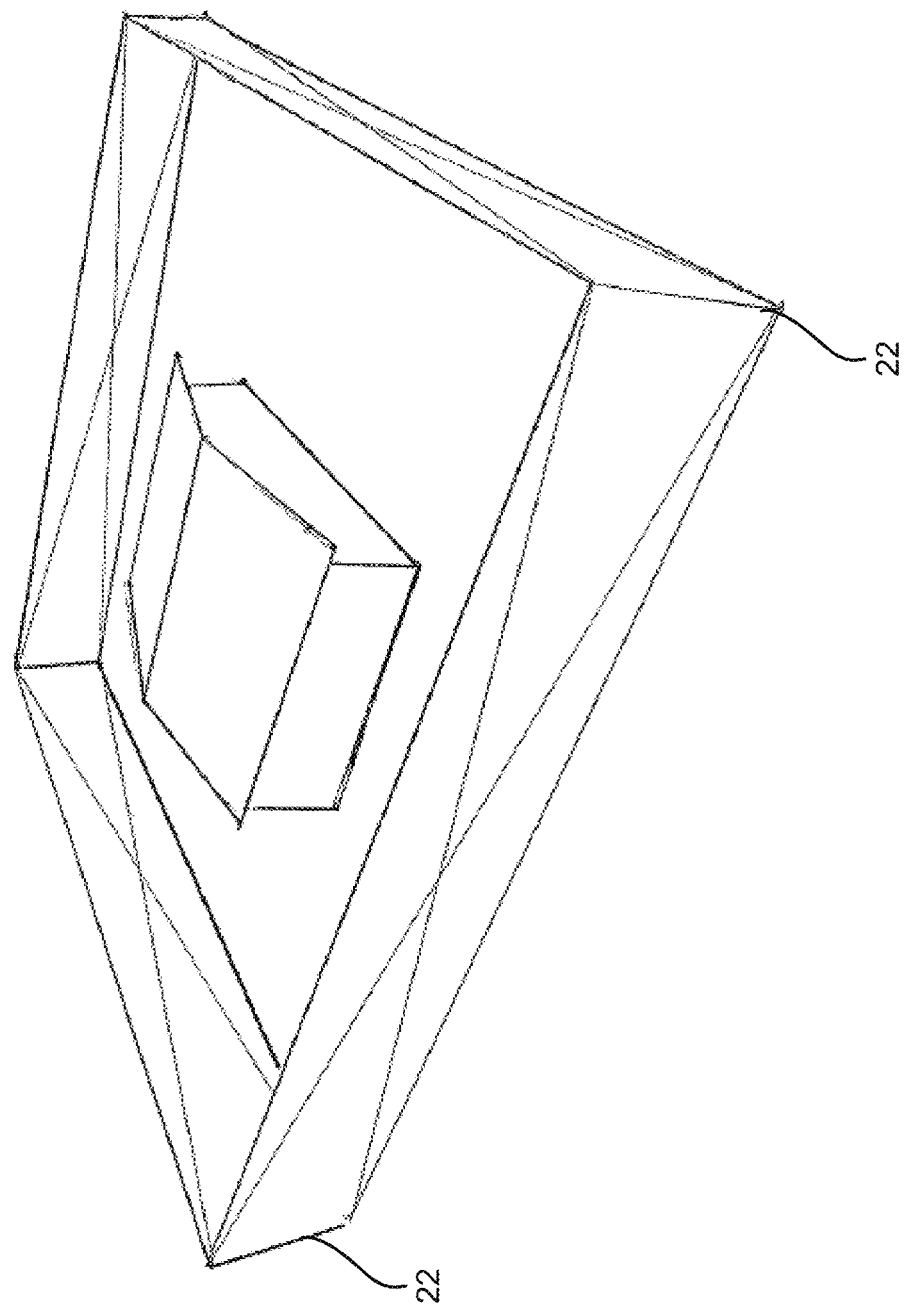
FIG. 2 illustrates an embodiment of a system surrounding a structure.

As illustrated, retroreflective surface 14 is placed on adjacent support post 24 spaced apart from the support post 22 to define an intermediate region. In some embodiments, imagers or retroreflective surfaces may be placed on multiple support posts. For example, in some embodiments, support posts may be arranged to surround an area of interest, as illustrated in FIG. 2, and imagers or retroreflective surfaces may be arranged on the support posts so as to view all, substantially all, or at least a portion of the entrances to the area of interest. While elements placed on support post 22 in FIG. 1 have been placed apart for clarity in illustration, in practice they may be more closely spaced.

In the illustrated embodiment, support posts 22 and 24 have a height selected to exceed the typical flying height of an insect of interest. For example, more than 99% of *Anopheles* mosquitoes (which may carry strains of malaria that can infect humans) fly at less than 3-5 meters of altitude, so support posts of 3-5 meters may be used in a system that can view substantially all mosquitoes passing through an area of interest. The width of support posts 22 and 24 is selected to provide adequate support and surface area for components including retroreflective surface 14; in the illustrated embodiment, the support posts are 10-20 cm wide, and are placed 100 m apart. The width of retroreflective surface 14, and of the field of view of imager 10, may be selected as a function of the flight speed of the target(s) of interest and the frame rate of imager 10, such that the silhouette of an insect will be within the field of view for at least one full frame interval, and as a function of the flight speed and the desired wingbeat sensing accuracy, such that the silhouette will be within the field of view for a sufficient period to make a measurement of the desired accuracy.

Illumination source 12 (which may be, for example, a laser, an LED, an incandescent light, a mirror reflecting sunlight, or any other suitable light source) directs light from support post 22 toward support post 24 to illuminate the retroreflective surface 14 on support post 24. In the illustrated embodiment, illumination source 12 is an LED producing a fan-shaped beam. Retroreflector 14 returns light to imager 10. When an organism 26 (such as a mosquito) travels between posts 22 and 24, the organism appears as a dark shadow on the retroreflective background 14 or as a break in a beam of light. Upon detecting such a shadow, in some embodiments, imager 10 may shift to a higher frame rate or a higher spatial resolution local to the shadow. Alternatively, a second imager (not shown) may be employed to collect a higher frame rate or higher resolution image in a small region local to the shadow. The higher frame rate image may be used, for example, by processor 16 to identify a wingbeat frequency for the mosquito (or other flying organism). In some embodiments, the sensing of organism 26 may trigger a forward-facing light. In other embodiments, a forward-facing light may be always on, or turned on when ambient light is low. Forward-facing illumination is expected to be preferred if it is desired to identify color data for the organism. In some embodiments, forward-facing light may be provided by targeting laser 18, or by a more broad-band source (not shown). Wingbeat frequency and harmonics may be used to determine probable species, sex, and other biological properties such as mating status of a mosquito; for some information on characteristic frequencies, see Robertson, et al., "Heritability of wing-beat frequency in *Anopheles quadrimaculatus*," *J. Amer. Mosquito Control Assoc.*, 18(4):316-320 (2002); Moore, "Artificial Neural Network Trained to Identify Mosquitoes in Flight," *J. Insect Behavior*, 4(3):391-396 (2005); "An Automated Flying-Insect Detection System," *NASA Technical Briefs*, SSC-00192 (2007), available at <www.techbriefs.com/content/view/2187/34/>; Göpfert, et al., "Nanometre-range acoustic sensitivity in male and female mosquitoes," *Proc. Biol. Sci.* 267(1442):453-457 (2000); and Gibson, et al., "Flying in Tune: Sexual Recognition in Mosquitoes," *Curr. Biol.* 16:1311-1316 (2006), all of which are incorporated herein by reference.

In some embodiments, periodic data which is not directly related to wingbeats may be collected. In particular, it has been observed that Asian Citrus Psyllids rotate in space as they launch themselves into the air, and these rotations have a periodicity that may be captured by a system such as that shown in FIG. 1. See, e.g., our video available at <www.youtube.com/watch?v=fMu8n1_8Ozg>. In some embodiments, processor 16 may be configured to identify such rotation and separate it from wingbeats using data from imager 10. In such embodiments, higher frame rate and/or a second imager as described above may have utility in identifying rotary movements of the organism. In some embodiments, such rotary movements may be used to identify a species or other biological property of the organisms.

In some embodiments, harmonic frequency spectra may be of significant utility in identifying mosquitoes or other insects. For example, the second harmonic frequency of the wingbeats of certain honeybee species are substantially similar to the wingbeat frequency of certain species of mosquitoes. Thus, in some embodiments, spectral analysis of harmonic frequencies may be used to prevent spurious identification of honeybees as mosquitoes. In addition, concentrating on higher-frequency harmonics may allow faster detection and identification of insects in some embodiments by reducing the time period necessary to identify the frequencies present. Chen, et. al, have described a system using such spectra to identify mosquitoes and other insects. See Chen, et al., "Flying Insect Classification with Inexpensive Sensors," published at <arxiv.org/pdf/1403.2654v1>, a copy of which is included herewith and incorporated by reference herein.

In some embodiments, processor 16 may incorporate a graphics processing unit (graphics card) for analysis. The graphics processing unit (GPU) may have a parallel "many-core" architecture, each core capable of running many threads (e.g., thousands of threads) simultaneously. In such a system, full-frame object recognition may be substantially speeded as compared to traditional processors (e.g., 30 times as fast). In some embodiments, a field-programmable gate array may be directly connected to a high-speed CMOS sensor for fast recognition.

In addition to the higher-speed camera imaging of the organism, the system may also employ a targeting laser 18 (or other suitable nonlaser light source) and detector (such as photodiode 20) to confirm characteristics of organism 26. For example, if processor 16 identifies a morphology or frequency suggestive of an organism of interest (such as a mosquito), targeting laser 18 may be directed at organism 26 using location information from processor 16. The reflection of targeting laser 18 from organism 26 is detected by photodiode 20. In some embodiments, this reflection may have relatively lower image resolution but a very fast frame rate, wide frequency response, or a high sensitivity to changes in cross section of the organism. The signal from the photodiode may be used, for example, to measure wingbeat frequency or harmonics very accurately to identify the organism or to otherwise classify the organism into an appropriate category, or otherwise distinguish the organism. Targeting laser 18 may also or alternatively provide additional light for higher frame rate or higher resolution image acquisition by imager 10.

The second imager or targeting laser 18 may be aimed by a galvanometer, MEMS device, or other suitable optical pointing systems. In some embodiments, the second imager or targeting laser 18 may be aimable in two dimensions, while in others, a single-axis galvanometer system may be used to allow the targeting laser to track within a single firing plane. In one-dimensional systems, a series of two-dimensional images captured by imager 10 may be used to predict when organism 26 will cross the firing plane, at which point it may be illuminated by targeting laser 18. In some embodiments, targeting laser 18 may be continuously scanned through space, for example by a rotating or oscillating mirror, and fired when its projected path intersects with the organism. In some such embodiments, the scan path may be dynamically adjusted, for example to provide a dwell time at a target location.

While the targeting laser 18 is described as being aimed by a galvanometer, MEMS device, or other targeting system, such aiming may be implemented via direct physical positioning of the laser, or through direction by an optical system, including conventional optical components, such as acoustical optic scanners, scanning mirrors, or similar. In some embodiments, a phase detection autofocus system such as that described in U.S. Pat. No. 6,480,266, which is incorporated by reference herein, may be used to focus the laser at the point of interest.

Figure 3:
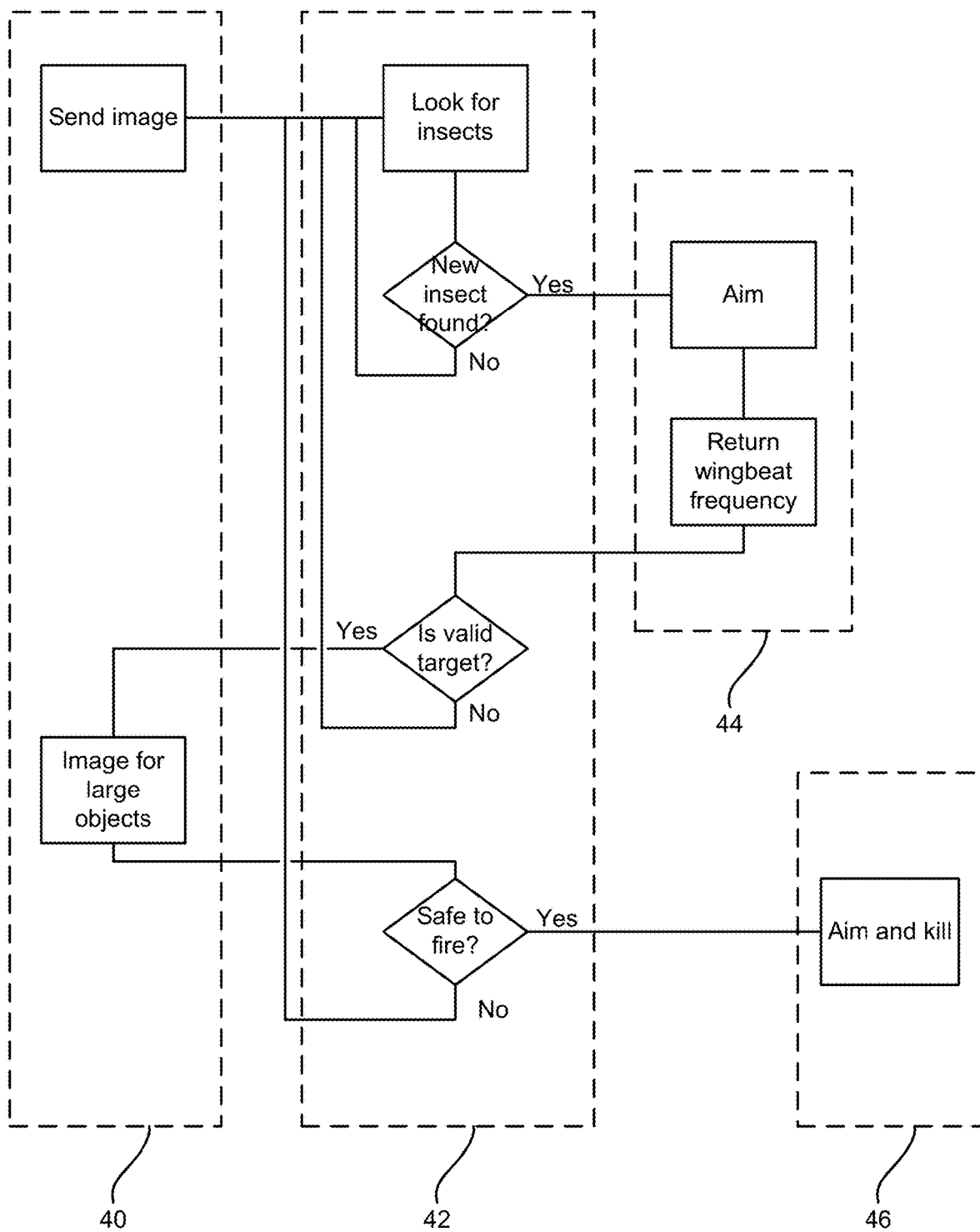
FIG. 3 is a control flow diagram for an implementation of a tracking and dosing system.

In some embodiments, once the organism has been identified or otherwise categorized or characterized, it may be desirable to take action to disable or destroy the organism. For example, in some embodiments, when a mosquito has been detected as entering the field of view, a countermeasure such as a laser beam may be used to disable or destroy the mosquito. In such embodiments, location information for the organism 26 may be passed from the imager 10, the processor 16, the targeting laser 18, or an associated targeting processor, not shown, to a dosing laser 28. In some embodiments, other countermeasures might include a sonic countermeasure transmitted by an acoustic transducer, a physical countermeasure such as a solid or liquid projectile, or a chemical response, in lieu of or in addition to dosing laser 28. In some embodiments, targeting laser 18 and dosing laser 28 may be the same component, for example using a higher amplitude for dosing than for targeting. In other embodiments, targeting laser 18 and dosing laser 28 may be separate components. In this case, they may optionally use a common aiming and/or focusing mechanism such as a beam splitter or beam combiner that allows dosing laser 28 to fire along the same path as targeting laser 18. FIG. 3 is a control flow diagram for an implementation of the tracking and dosing system, illustrating cooperation of imager assembly 40, processor 42, targeting laser assembly 44 and dosing laser assembly 46.

Figure 4:
FIG. 4 is a photograph of a damaged mosquito wing.

In some embodiments, undesirable organism 26 may be killed by dosing laser 28. In other embodiments, dosing laser 28 may instead disable organism 26 in a variety of ways. For example, if it is desired to inhibit spread of malaria, it may be sufficient to impede a female mosquito's ability to blood feed, disrupting the disease cycle. In some embodiments, this may be accomplished by damaging or destroying the antennae. Damage to the antennae may also inhibit mating behavior, which may reduce the overall mosquito population if enough mosquitoes in a region can be dosed. In some embodiments, reproduction may also be slowed or prevented by impairing fertility of the female or the male mosquito. Radiative treatment may also impair the metabolic efficiency of mosquitoes or other insects, or may damage essential body structures such as the wings or eyes without immediately killing the insect. FIG. 4 is a photo of a mosquito wing which has been damaged by laser treatment.

In some embodiments, rather than or in addition to targeting organisms for destruction, the system of FIG. 1 may be used as a census-taking device. If desired, the system may be left unattended for a substantial period of time to determine activity as a function of time of day, weather, season, or other changing environmental parameters, and flight characteristics of different organisms may be tracked over time. By analyzing shape, size, wingbeat frequency, wingbeat harmonics, position, flight patterns, airspeed, or groundspeed, information about biological properties such as genus, species, gender ratios, age distribution, mating status, and the like may be determined for the organism population. In some embodiments, it may be possible to determine disease-carrying status, since it is expected that disease carriers such as malarial mosquitoes will have different characteristics perceivable by the system (e.g., flight characteristics, shape, size) due to body stresses associated with illness. In some embodiments, these characteristics of disease-carrying organisms may be identifiable via statistical bias (e.g., while the system may not identify individuals as diseased, it may be able to tell that some fraction of the individuals observed are diseased). Such embodiments may be useful for targeting disease mitigation strategies into areas of highest infection rate, for example. In embodiments including a dosing laser or other countermeasure, in circumstances where it is undesirable or impractical to incapacitate all mosquitoes (or other insect pests), discrimination by sex or other biological status may allow more effective eradication of the population as a whole (for example, by preferentially targeting gravid females, females ready for mating, or mosquitoes already infected with malaria). In some embodiments, identification of a particular biological property (of an individual or a population) may trigger a notification to be sent to a remote location. For example, if a single Asian Citrus Psyllid is detected in an area expected to be free of them (e.g., an orchard), the system may notify the farmer (or any appropriate remote user) so that countermeasures can be taken and defenses examined for "leaks," or if the system identifies a noticeable increase in population of mosquitoes or of malarial mosquitoes in a particular region, it may notify doctors and/or scientists so that the change can be promptly addressed.

While the embodiments described herein have related to ground-based systems mounted upon fixed vertical supports, a variety of other design configurations may be implemented by one of skill in the art. In some embodiments, a substantial portion of the components or even all of the components may be mounted upon a single support unit. For example, a single post having lasers and cameras at the top may illuminate and view a surrounding horizontal ring of retroreflector, forming a conical or tent-like detection area. For another example, one or more lasers and cameras may be rotated or translated so as to sweep the narrow camera field of view across a large volume, so as to detect insects anywhere within a volume (such as a room); in this case a large area of retroreflector material such as a retroreflective paint or tape can be applied to one or more walls of the room.

In one approach, one or more components may be mounted on a moving support such as a ground-based vehicle, air-based vehicle (e.g., a UAV), or other vehicle. If imager and targeting or dosing lasers are mounted on an airborne vehicle, it may be impractical to provide a retroreflective surface as described above. In some such embodiments, organisms may be located by ground-looking radar. For a vehicle traveling at 50 m/s and scanning a 100 m swath of ground, a relatively modest transmitter power (in the tens to hundreds of milliwatts) may provide an adequate resolution for locating organisms for a targeting laser.

In some embodiments, the imager or the detector may receive light that is produced responsive to the illuminating light. For example, as described in Belisle, et al., "Sensitive Detection of Malaria Infection by Third Harmonic Generation Imaging," *Biophys. J.* 94(4):L26-L28 (2008), which is incorporated herein by reference, certain components of tissue or residue such as biological waste products (e.g., hemozoin crystals produced by malarial mosquitoes) may produce wavelengths of light different from the illuminating light through any of a variety effects, including three photon effects. In one such approach, illuminating light may be selected to correspond to a response of hemozoin. The detector may then detect light at a frequency corresponding to a resonance of the hemozoin.

It may be appropriate in some applications to provide a guard region around the targeting or dosing light beam. In such an approach, an appropriate detection system may determine the presence of objects or organisms within a region surrounding the target object. If such an object or organism is detected, the system may determine that it is inappropriate to activate the targeting or dosing light source, for example, to prevent damage to such objects or organisms. In one example, the guard region may be configured to detect the presence of humans or domestic animals within a selected proximity of the area to be illuminated. Such systems may be implemented using the illuminating light source, or an alternative light source, such as an LED or similar source arranged to illuminate a region surrounding the expected path of the targeting or dosing beam. Alternatively, the imaging system may detect humans or domestic animals in the field of view and avoid transmitting the targeting or dosing light beam.

In some cases the illuminating light source may have sufficient power to cause harm, for example if a person or animal looks directly into the light source. The system may be configured to detect the presence of large obstructions and turn off or reduce the power of the illuminating light source before harm is done.

It will be understood that "identification" of organisms (such as mosquitoes and other insects) on the basis of wingbeat characteristics, morphology, or other measurements, may be probabilistic in nature. For example, it may be determined that it is more likely than not that a given organism is a gravid female *Anopheles* mosquito, and actions may be taken on that probability, even though other genera, sexes, or statuses cannot be ruled out.

Maintenance and Olfactory Testing of Mosquito Population

We have maintained and tested a population of *Anopheles stephensi* in an insectary. The mosquitoes were kept in a maintained environment of a 12 h:12 h light: dark cycle; air temperature 80° F.±10° F. and 80%±10% humidity. Adult mosquitoes were held in a variety of containers. Breeding populations were placed into 12"×12" white semi-transparent plastic containers with plastic mesh sides and a front sleeve for easy access. To sugar feed the adults, we used a Petri dish full of raisins. We placed a Petri dish lined with 9 cm filter paper, filled with water inside the cage. This dish functioned as water source as well as an egg laying cup. The bottom of the cage was covered with absorbent paper towel to limit fungal growth due to urine and blood excretions of the females.

When adult mosquitoes were about six to ten days old, we blood fed the females while they were still inside their cages. We used Hemostat brand sheep blood. The feeding apparatus was a 10 cm Plexiglass Petri dish which had a copper coil tube glued to the bottom and circulated warm water to keep the blood at body temperature. The bottom of the feeding apparatus was filled with water at 98° F. We stretched parafilm to loosely cover the water in Petri dish. Then sheep blood was added to the apparatus and another layer of Parafilm was stretched to cover the blood. A bucket of water between 98 and 100° F. was placed in the insectary. It was hooked to the copper tubing of the feeding apparatus using plastic tubing and fittings. Inside the bucket there was an aquarium pump and a heater that circulated the warm water to the feeding apparatus. The feeding apparatus was placed in a cage through the sleeve. The sleeve was secured around the plastic tubing and mosquitoes were allowed to feed until satiation. Once females had taken blood, they were observed to find a quiet spot to rest and digest. Three to five days later eggs were laid in groups of 50 to 200 on the surface of the water. These eggs hatched after two days. (See, Benedict, M. Q., in *Molecular Biology of insect disease vectors*. Ed. Crampton, Beard and Louis. Chapman and Hall, London, pp. 3-12, 1997, which is incorporated by reference herein)

Experimental cages, hereinafter referred to as cradle to grave (C2G) boxes, were made of 12"×12" interconnected clear acrylic. The sides and bottoms of the boxes were glued together, and they were reinforced by tabs for additional security. For ease of cleaning and access during manipulation of the mosquitoes, the top of the cage was not glued into place. There were two 6" diameter openings on opposite sides of the cage. The one in the front was covered with a sleeve and the one on the back was lined with fine mesh, providing a texture on which mosquitoes could land. On the front, 2.5" to the right of the sleeve and 2" below, there was a 0.5" diameter pipe fitting covered with mesh. This fitting was used to connect a $CO_2$ tank during anesthetization of mosquitoes. While the mosquitoes were anesthetized, the lid was removed and mosquitoes could be handled for experiments.

There are certain advantages of using a cradle to grave box over other types of mosquito containment cages. Cradle to Grave boxes are clear; they allow the experimenter to observe behavior or document data without obstructed view. Another advantage of the box over conventional cage is limiting the number of times mosquitoes are handled. 50 to 100 pupae were placed in a Cradle to Grave box and allowed to emerge. Once the adult mosquitoes were four to five days old, they were ready for experimental manipulations. The port made of 0.5" pipe fitting can be attached to $CO_2$ for anesthetization; this eliminates the need to chill the mosquitoes, and consequently condensation does not occur during various methods of cold application. Our handling experiences suggest using aspirators during mosquito retrieval may affect their lifespan adversely. In the Cradle to Grave box, there is typically no need to aspirate mosquitoes into other containers.

White plastic rectangular trays (15"×7"×1.5") were used to contain larvae. Once the eggs were laid, they were washed carefully into a white tray for hatching. To provide food for larvae, 50% w/w active (live) baker's or brewer's yeast and ground tropical fish flakes were added to white trays. The trays are filled halfway with distilled water. Achieving the right density of larvae in trays is known to be important in their growth and development. The most common problems associated with overcrowding are longer development time, reduced pupation and eclosion, and a decrease in pupal weight. Studies have shown that crowded larvae exhibit several negative effects: lower weight at emergence, quantity of the blood meal and lower overall fertility rates (Benedict, 1997). If trays are overcrowded, thinning the larvae is preferred to maintain a healthy population. After the fourth molting, pupae develop. Pupae were collected daily and placed into the opaque breeding cages for continuation of the colony, or transferred into clear experimental cages.

Adult mosquitoes were retrieved from their cage into smaller containers using an aspirator made of two clear tubes connected to an electric pump. These retrieval boxes were 3.5"×3.5"×2.5" and made of clear acrylic. One side of the box had a 2.44" diameter opening which is covered with fine mesh and allowed air flow as well as providing a textured surface for mosquitoes. One side of the retrieval box had two 0.5" pipe fittings that were used to connect tubes. These pipe fittings could be plugged with acrylic rods when the aspirator was not in use.

After mosquitoes were anesthetized with $CO_2$ for experimental purposes, fine camel brushes were also used to change the position of the mosquitoes.

To identify and assess the olfactory behavior of mosquitoes, we designed a bioassay, based on an olfactometer similar to that described in Geier et al., *Entomol. Exp. Appl.* 92:9-19, 1999 (which is incorporated by reference herein; see also Braks, et al., *Physiological Entomology* 26:142-148, 2001, incorporated by reference herein), which met the following requirements:
1. Monitoring of all behavioral sequences in the host finding process such as perception, activation, orientation towards the odor source, and landing.
2. Simple and fast testing of many odor samples in a limited time.
3. Easy comparison of extracts from natural odor sources or synthetic attractants (see, e.g., Miller, et al., In *Chemical Ecology of Insects*, W. J. Bell, & R. T. Cardé (eds.), Chapman and Hall, New York, pp. 127-157, 1984; Sutcliffe, *Insect Science and its Application* 8: 611-616, 1987, both of which are incorporated herein by reference).
4. Wide measuring range to differentiate the strength of attractive stimuli.
5. Easy clean-up to avoid contamination caused by previous stimuli (Schreck, et al., *J. Am. Mosquito Control Assoc.* 6: 406-410, 1990, which is incorporated herein by reference).

The olfactometer was constructed out of 7 mm thick transparent acrylic sheets. Twelve Y-shaped layers were placed on the acrylic base and bolted together on a metal table. Screened removable chambers were located at each end: a release chamber at the base of the Y-shape, and two chambers at the end of the arms. A transparent removable lid was bolted to the layers below and provided containment for mosquitoes. The resulting construction allowed for easy observation during experiments.

A 12 V fan was attached to the release chamber providing a wind-tunnel effect, luring mosquitoes away from the stimulus. Mosquitoes traveled 89 cm to reach the stimulus chambers.

In a standard experiment, at least 25 female mosquitoes were aspirated into the release chamber using the human hand as bait. This procedure ensured that all mosquitoes used in the test were ready to seek for a host. The release chamber was made of clear acrylic, which was sized 3.22"× 3.22"×3.24". Two sides of the release chamber had acrylic screens, one of which was removable for cleaning or other manipulation purposes. The release chamber also had two 0.5" pipe fittings to connect an aspirator or $CO_2$ source as needed.

Five minutes after the release chamber was attached to the olfactometer, the test stimulus was presented in one arm while the control chamber remained empty. At the same moment, the release chamber opened and mosquitoes entered the device. The fan was then turned on to lure the mosquitoes back into the release chamber. Five minutes into the experiment, the mosquitoes were counted (those mosquitoes remaining in the release-, stimulus-, and control chambers, respectively). At the end of the experiment, $CO_2$ gas was pumped through the stimulus chambers and anesthetized mosquitoes transferred back to the insectary.

Olfaction experiments such as those described herein may be used to test attractants for bringing species within range of the targeting system. They may also be used to determine whether mosquitoes' ability to seek human prey has been affected by dosing with photons as described herein.

Mosquito Vulnerabilities

In general, nocturnally active blood-feeding mosquitoes such as the African malaria mosquito *Anopheles gambiae* locate and identify their vertebrate hosts primarily by odor. The olfactory organs in adult female mosquitoes are associated with the antennae and maxillary palp. These are covered by hair-like sensilla. The sensilla are innervated by olfactory receptor neurons as well as by mechano-, thermo-, or hygroreceptor cells. The olfactory cues exhaled in the breath (e.g., carbon dioxide) or excreted from the skin (e.g., components of sweat) are detected by the sensilla, allowing the female mosquito to home in on a potential human host. (See, e.g., Ghaninia et al., *Eur J Neurosci.* 26:1611-1623, 2007). The dependence upon the antennae and maxillary palp for sensing the proximity of a human host suggests that disruption of these important sensory organs may be a means of preventing mosquitoes from finding and biting their human victims.

Chemical odorants for use in an olfactometer such as lactic acid or ammonia, for example, are available from commercial sources and prepared by standard methods. In some instances, a concentration gradient of odorant from 0.001 to 100 mg/ml, for example, is used to assess the mosquito response. Human sweat for olfaction experiments may be collected from the foreheads or other body parts of human volunteers undergoing physical exercise in a warm, humid environment. The sweat is either frozen immediately to −20° or allowed to incubate at 37° C. for several days. Work from Braks, et al. (referenced above) suggests that while fresh human sweat can be a mild attractant, sweat that has been "aged" is a particularly potent attractant. Other methods for extracting skin odorants include continuous swabbing of human skin with a cotton swab for about 5 minutes or simply inserting a human extremity (e.g., a finger) into the trapping port (see, Dekker, et al., *Medical Veterinary Entomology* 16:91-98, 2002, which is incorporated by reference herein).

In addition to blood meal, female as well as male mosquitoes feed on plant nectar as an energy source, which they locate chiefly by visual and chemical cues. Nectar sources do not appear to be as attractive as blood sources, but sugar feeding is usually necessary and more frequent than blood feeding (see, e.g., Foster & Hancock. *J Am Mosquito Control Assn.* 10:288-296, 1994, which is incorporated by reference herein). As such, the effects of laser treatment on the ability to locate a nectar source can also be assessed.

The structural integrity of antennae following laser treatment may be assessed using light microscopy or scanning electron microscopy (see, e.g., Pitts & Zwiebel, Malaria J. 5:26, 2006, which is incorporated by reference herein). For light microscopy, the antennae are hand dissected from cold-anesthetized, laser treated or untreated mosquitoes and placed in 25% sucrose and 0.1% Triton X-100 in water. The antennae are mounted on microscope slides in this solution, covered with a glass coverslip, and sealed with, for example, enamel nail polish. Standard light microscopy at 400× magnification is used to assess the integrity of the antennae.

For scanning electron microscopy, the antennae from either laser treated or untreated mosquitoes are hand dissected and fixed with 4% paraformaldehyde, 0.1% Triton X-100 in phosphate buffered saline. The antennae are then dehydrated through a series of alcohol solutions such as ethanol at 50% to 100% in 10% increments. The heads are further extracted through a series of ethanol:hexamethyldisilazane (HMDS) solutions at ratios of 75:25, 50:50, 25:75 and 0:100. The HMDS is removed and the samples are allowed to dry in a fume hood. The desiccated samples are glued onto pin mounts with colloidal silver paint and sputter coated for about 30 seconds with gold-palladium. The samples are viewed using a standard scanning electron microscope. Alternatively, the antennae are quick frozen in liquid nitrogen and subsequently freeze dried to remove any water vapor in preparation for cryo-scanning electron microscopy at −190° C. In some instances, the head or whole mosquito is used for analysis.

Electroantennography (EAG) is a method for recording electrical potentials from insect antennae in response to stimuli and can be used to assess the functional integrity of antennae following treatment with the laser. EAG records the "slow" changes in potential that are caused by the superposition of simultaneous membrane depolarizations of numerous receptor cells in response to stimuli. This approach can provide information on the olfactory perception of the insect. An electroantennogram can be performed by removing the antenna from either laser treated or untreated mosquitoes and inserting wires at either ends of the antenna and amplifying the voltage between. The antenna is exposed to an odorant and any deflections in the electroantennogram waveform due to sensory response are recorded. Alternatively, a laser treated or untreated mosquito is left intact and a ground wire or glass electrode is placed into some part of the body such as the eye, for example, and a second electrode is attached to the end of the antenna. Alternatively, all or part of a laser treated or untreated mosquito is fixed on the tip of a holder with a conducting electrode gel. The tip of the antenna is pushed into a small drop of the same gel associated with a recording electrode (silver wire; see, e.g., Puri, et al., *J. Med. Entomol.* 43:207-213, 2006, which is incorporated by reference herein). The antenna is exposed to odorant and changes in the electroantennogram waveform are noted. Using this approach, the normal response to odorants in untreated mosquitoes can be compared with the response recorded in laser treated mosquitoes.

To assess whether specific sensilla on the antenna or maxillary palp have been damaged by the laser treatment, odor response at the olfactory sensory level can be done using sensilla recording. The sensilla contain olfactory receptor neurons and action potentials of single neurons can be recorded in situ and the olfactory receptor neurons classified according to their response to various odorant stimuli. In this technique, microelectrodes are inserted into the base of a sensillum and moved with a micromanipulator to a position at which electrophysiological activity can be recorded. The signals are digitized and observed as spikes of activity. The antenna is exposed to a puff of odorant and the firing frequency of the neuron is recorded. As above, the normal response to odorants in untreated mosquitoes can be compared with the response recorded in laser treated mosquitoes.

The antennae of mosquitoes are also important for sensing the proximity of a potential mate (see Hoy, *PNAS* 103: 16619-16620, 2006; Cator et al., *Science* published on line Jan. 8, 2009, both of which are incorporated by reference herein). More specially, male mosquitoes detect the presence of nearby female mosquitoes by hearing the female's flight tones using a special organ called the Johnston's organ at the base of each antenna. A mosquito detects the particle velocity component of a sound field in its immediate vicinity. The antenna, with its fine, flagellar hairs, senses movements of air particles as they are moved about by incoming acoustic waves. A male mosquito is able to hear a nearby female's wing beat frequency (approximately 300-600 Hz, depending upon the species) and fly off in pursuit. In the case of *Aedes aegypti,* both male and female mosquitoes are able to adjust the harmonic resonance of their thoracic box to produce a harmonic frequency that is three times that of the female wing beat (400 Hz) and two times that of the male wing beat (600 Hz), converging at a frequency of 1200 Hz at the time of mating (Cator et al.). In this instance, mate attraction is acoustically driven and involves active modulation by both sexes.

During the mating process, the ability to hear the appropriate flight tones of a nearby female is dependent upon the antennae and associated Johnston's organ. Likewise, the ability to generate a wing beat frequency capable of attracting a mate is dependent upon functional wings. As such, disabling the antennae or wings would potentially prevent productive mating.

In general, females emerge from the pupal case ready to mate where as their male counterpart in many species may require several days to reach sexual maturity. However, in most species, there is a 24-48 hour lag between emergence and mating. Mating is not needed for egg development and maturation, but in most species eggs can only be deposited when insemination has occurred. Female mosquitoes usually mate before taking their first blood meal, although in several anophelines, a large population of virgins may blood-feed prior to mating. In *Aedes aegypti,* mating is accompanied by the transfer of "matrone", a male hormone which makes the female refractory to successive matings and induces blood host-seeking behavior. This type of behavioral change is not consistently noted in *An. gambiae.* The success of male mating is determined by fitness, and may have consequences for the number of times a male can mate. A number of issues regarding mating behavior have not been fully explored or understood including the cues that control male swarming, male feeding behavior and fitness, female mate-location behavior, pre- and post-mating behavior, frequency of multiple-species swarming, factors that prevent hybridization of closely related species, and factors that control multiple mating (as outlined by Takken et al., in "Mosquito mating behaviour", in *Bridging laboratory and field research for genetic control of disease vectors.* pp. 183-188, Ed. G. J. Knols & C. Louis, Springer, Netherlands, 2006, which is incorporated by reference herein).

Male fitness and associated reproductive success may be a function of an individual's ability to find and exploit a nectar source (see, e.g., Yuval et al., *Ecological Entomology.* 19:74-78, 2008, which is incorporated by reference herein). Males tend to swarm at dusk, a behavior that consumes a considerable amount of energy relative to resting behavior. Females enter the swarm of males for mating purposes (see, e.g, Charlwood, et al., *J. Vector Ecology* 27:178-183, 2003, which is incorporated by reference herein). Sugar feeding in *An. freeborni,* for example, takes place during the night at a time after swarming has concluded and as such nectar sugars are not immediately available for flight but must be stored in some form. As such, disrupting the ability to fly or the ability to find or store an energy source will have deleterious effects on mating success.

Alterations in wing beat frequency in response to laser treatment can be assessed using a particle velocity microphone as described by Cator, et al. (*Science* Published on line Jan. 8, 2009). Either laser treated or untreated mosquitoes are tethered to the end of an insect pin. When suspended in midair, the mosquitoes initiate bouts of wing-flapping flight. Sound clips from normal and laser treated mosquitoes are digitized and compared to assess the effects of laser treatment on wing beat frequency. Alternatively, high speed photography can be used to assess changes in wing function.

Thermal stress may be used to alter the normal embryonic development of mosquito eggs. Huang, et al. demonstrated that subjecting mosquito eggs to increasing temperatures from 40 to 48° C. reduced the viability of the eggs (see, e.g., Huang, et al., *Malaria J.* 5:87, 2006, which is incorporated by reference herein). Exposure to temperatures of 44-45° C. and higher dramatically decrease the number of eggs that hatched. As such, subjecting the female mosquito to laser induced thermal stress may also alter the viability of her eggs.

In one set of experiments, female mosquitoes are allowed to blood feed and are subsequently subjected to laser treatment as described herein. Following a recovery period and prior to laying of eggs, the female mosquitoes are cold-anesthetized and the eggs are dissected out and counted. The eggs may be further subjected to scanning electron microscopy or other forms of microscopy to determine whether treatment with the laser has disrupted the structural integrity of the eggs. For example, the various stages of ovogenesis in mosquitoes may be assessed using scanning electron microscopy (Soumare & Ndiaye. *Tissue & Cell.* 37:117-124, 2005, which is incorporated by reference herein). Alternatively, the females are allowed to lay their eggs following laser treatment. In this instance, the number of eggs laid, the number of hatched eggs, and the number of viable offspring are compared between laser treated and untreated individuals.

In a second set of experiments, female mosquitoes are subjected to laser treatment as described herein prior to blood feeding. After blood feeding, the females are allowed to lay their eggs and as above, the number of eggs laid and the viability of the eggs are determined. In these experiments, the number of females that take an offered blood meal may also be determined in exploring effects on fertility.

Blood feeding is necessary for the process of laying and hatching viable offspring. Disrupting the ability of the female to access blood meal is anticipated to reduce the number of viable offspring. As noted above, the female uses olfaction to find a blood host. As such, in one set of experiments, the blood meal is placed on the other side of a trap portal through which the mosquito must pass to access food. The trap portal emits an attracting human odorant such as human sweat or expired carbon dioxide. The ability of laser treated females to access the blood meal is recorded as is the number of laid eggs, the number of hatched eggs, and the number of viable offspring.

In general, the effects of laser treatment on male and female fertility can be assessed by treating either a population of males or a population of females with laser energy and allowing the treated individuals of one sex to breed with untreated individuals of the other sex. As above, the outcome measurement of this assessment is the number of laid eggs, the number of hatched eggs, and the number of viable offspring. For the purposes of this experiment, male and female individuals are treated with laser energy prior to mating. Male and female individuals can be sexed at the larval stage, allowing for the isolation of single sex populations (see, e.g., Emami, et al., *J. Vector Borne Dis.* 44:245-24, 2007, which is incorporated by reference herein). For example, male *An. stephensi* mosquitoes are identified by a tube-like organ at the $9^{th}$ abdomen segment as well as two fried egg-shaped structures in the anterior portion of the segment. In female *An. stephensi* mosquitoes, the tube-like organ is smaller and the fried egg-shaped structures are absent. Using a light microscope, it is possible to segregate the larva into separate male and female populations. Alternatively, sexing may be done following emergence from the pupal stage. Adult male mosquitoes can be distinguished from adult female mosquitoes in that the males have more feathery antennae and have mouthparts not suitable for piercing skin. The emerged adults in the single sex populations are subjected to laser treatment and after recover are allowed to breed with untreated individuals of the opposite sex. The number of copulas is observed and recorded over a specific time frame. In addition, the number of laid eggs, hatched eggs, and viable offspring are recorded and may be assessed relative to the number of observed copulations. Similar experiments can be performed using populations of male and female mosquitoes that have both been subjected to laser treatment.

Calorespirometry can be used to measure respiration characteristics and energy metabolism of insects (see, e.g., Acar, et al., *Environ. Entomol.* 30:811-816, 2001; Acar, et al., *Environ. Entomol.* 33:832-838, 2004, both of which are incorporated herein by reference). The rates of respiratory metabolism are commonly reported as the rates of oxygen ($O_2$) consumption or carbon dioxide ($CO_2$) production and may be combined with heat production to assess metabolic efficiency. Analysis is done comparing the response of laser treated and untreated mosquitoes. The analysis can be done at one specific temperature such as, for example, an ambient temperature of 27° C. Alternatively, the effects of temperature on metabolic efficiency of treated and untreated mosquitoes can be assessed by performing the analysis at various temperatures ranging from about 0° C. to about 42° C. In this instance, temperature acts as a stressor.

A differential, scanning, heat conduction calorimeter is used for calorespirometry (e.g., Hart Scientific model 7707 or Calorimetry Sciences model 4100, Pleasant Grove, Utah). One or more mosquitoes for analysis are weighed and placed in a small paper cage within a sample ampoule. The cage is used to limit the mobility of the mosquitoes during analysis. The ampoule is supplied with sufficient oxygen to support aerobic respiration for at least one hour. Heat production is measured by the calorimeter and is represented as a function of body weight. $CO_2$ production is assessed by measuring extra heat generated over time when 0.4 M NaOH is included in the ampoule. The interaction of NaOH with the $CO_2$ produced by the respiring tissue generates $Na_2CO_3$ and heat. As such, the difference in heat rate produced by the mosquito sample with and without NaOH represents the heat rate caused by $CO_2$ trapping and consequently the rate of $CO_2$ formation. Analysis of heat and $CO_2$ production is performed at various temperatures to assess the effect of thermal stress on mosquitoes that have been treated with laser energy relative to untreated controls.

Photonic Dosing Experiments

A series of experiments examining the vulnerability to radiation of *An. stephensi* has been performed. Dosing experiments began by removing the food, water, and any other materials from the (floor of the) C2G box. Then the box was moved into the optics room. The mesh holes were loosely covered, and tubing from a $CO_2$ tank was hooked to the port on the C2G box. $CO_2$ was turned on, with the regulator opened up as wide as possible, resulting in roughly 50 scfh for a minute or so, until all of the mosquitoes were anesthetized. Then the $CO_2$ flow was turned down to a much lower level, typically 7-10 scfh.

Figure 5:
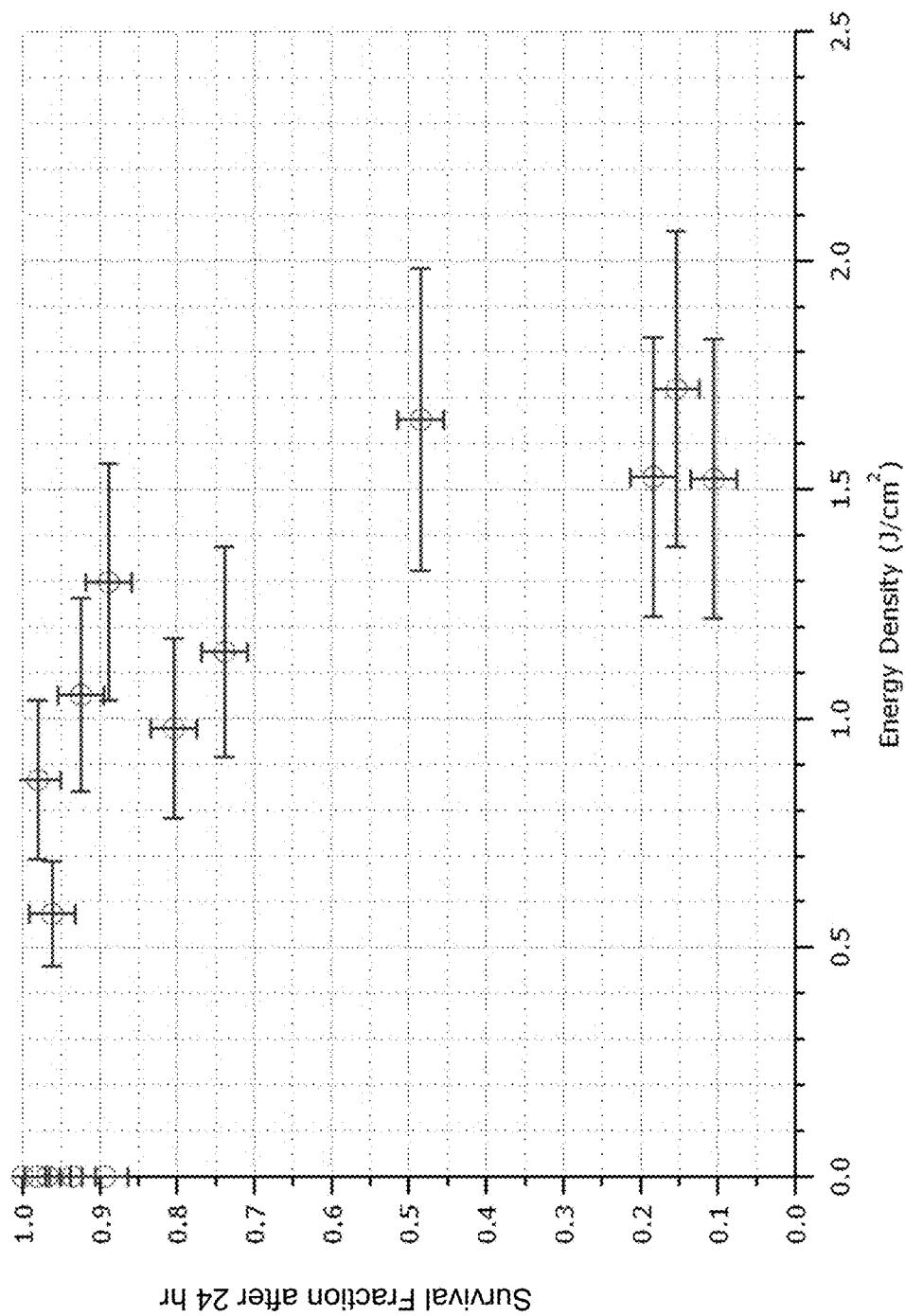
FIG. 5 is a lethality graph for a series of mosquito IR laser exposures.

FIG. 5 is a graph illustrating lethality of various doses of near-IR radiation as a function of energy density. The diode laser, capable of outputting up to 30 W of 808 nm light, was manufactured by Coherent, Inc. Optics were used to focus the beam to roughly 5 mm diameter at the mosquito. Pulse duration was varied from ~3 ms up to ~25 ms, and laser output power was varied from ~15 W up to ~30 W. Mosquitoes present in these experiments were predominantly female, although some males may have been present in some of the experiments. Subjects were exposed to $CO_2$ for 8-15 minutes during the experiments. Lethality is measured 24 hours after dosing.

Figure 6:
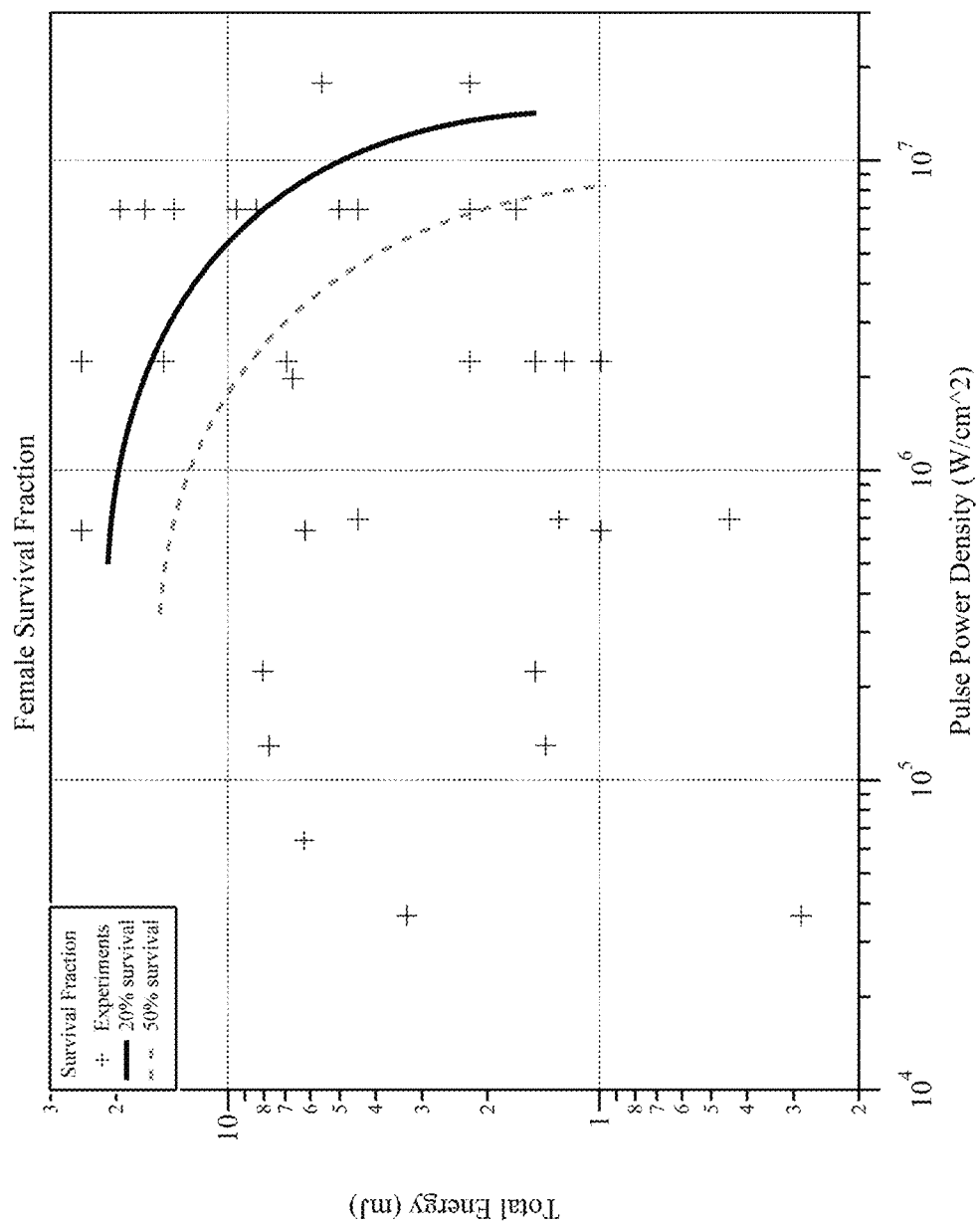
FIG. 6 is a lethality graph for UV laser exposures for female mosquitoes.
Figure 7:
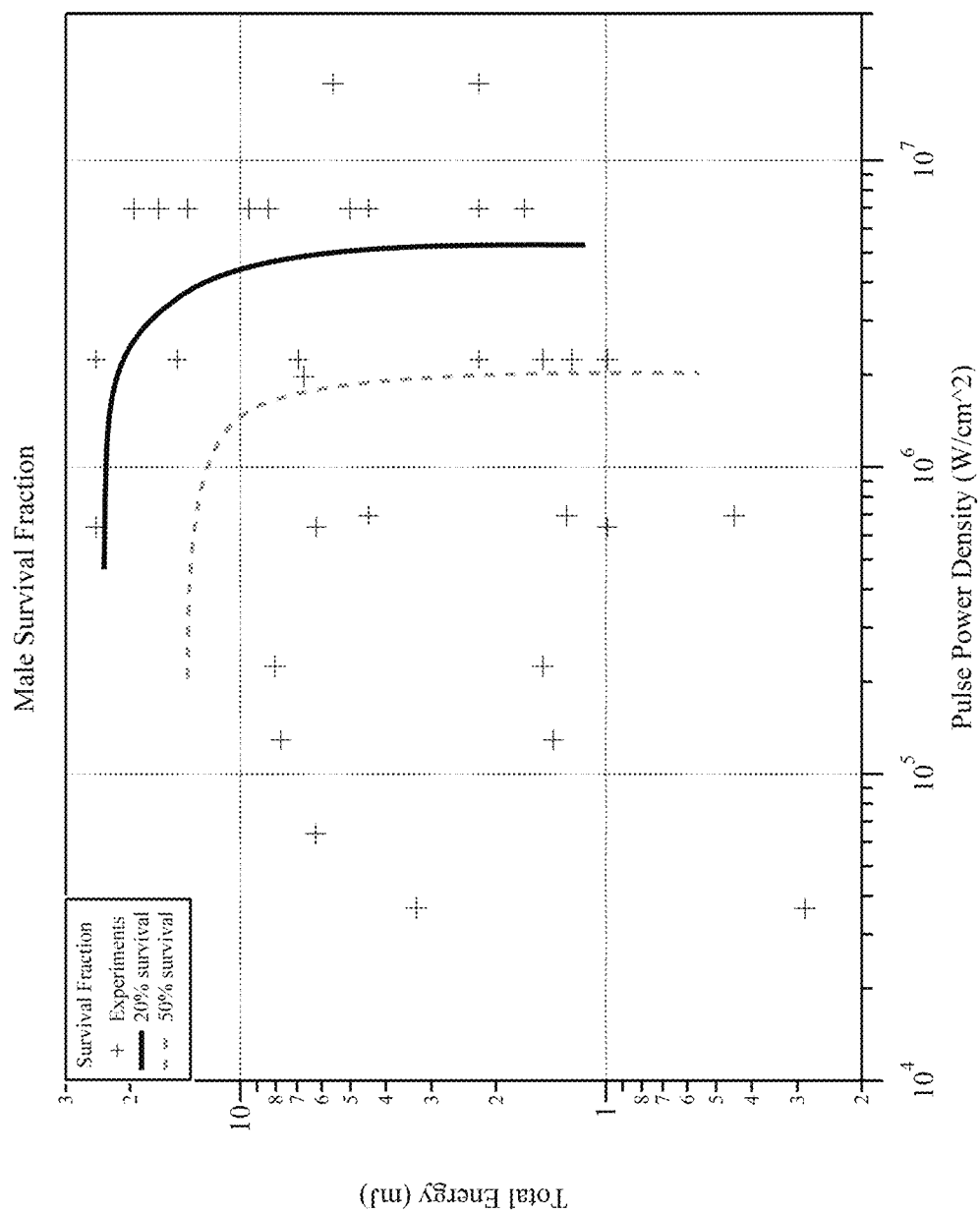
FIG. 7 is a lethality graph for UV laser exposures for male mosquitoes.

FIG. 6 and FIG. 7 are graphs illustrating lethality of various doses of ultraviolet radiation for different power densities and total energies for female and male *An. stephensi*, respectively. The dosing laser for these experiments was a high power water cooled deep UV laser from Photonix, operating at a wavelength of 266 nm. The data underlying these graphs are summarized in Table 1.

TABLE 1

| # Males @ start | # Females @ start | Female Survival % 24 hrs | Male Survival % 24 hrs | Power Density (W/cm^2) | Total Energy (mJ) |
|---|---|---|---|---|---|
| 23 | 11 | 18% | 13% | 6.94E+06 | 16.74 |
| 26 | 27 | 22% | 19% | 6.94E+06 | 8.37 |
| 12 | 40 | 15% | 8% | 1.78E+07 | 5.58 |
| 34 | 8 | 0% | 9% | 1.78E+07 | 2.232 |
| 35 | 11 | 18% | 6% | 6.94E+06 | 2.232 |
| 19 | 12 | 25% | 11% | 2.24E+06 | 1.488 |
| 30 | 16 | 81% | 43% | 3.65E+04 | 0.286 |
| 19 | 16 | 75% | 37% | 3.65E+04 | 3.3 |
| 7 | 24 | 83% | 29% | 2.24E+06 | 1.24 |
| 2 | 22 | 77% | 50% | 2.24E+06 | 0.992 |
| 8 | 21 | 95% | 100% | 6.38E+05 | 6.2 |

TABLE 1-continued

| # Males @ start | # Females @ start | Female Survival % 24 hrs | Male Survival % 24 hrs | Power Density (W/cm^2) | Total Energy (mJ) |
|---|---|---|---|---|---|
| 8 | 18 | 100% | 88% | 6.38E+05 | 0.992 |
| 17 | 26 | 88% | 65% | 6.38E+05 | 6.2 |
| 8 | 24 | 0% | 0% | 6.38E+05 | 24.8 |
| 8 | 18 | 0% | 0% | 2.24E+06 | 24.8 |
| 8 | 17 | 35% | 0% | 1.97E+06 | 6.696 |
| 13 | 21 | 90% | 77% | 1.29E+05 | 7.75 |
| 13 | 20 | 95% | 92% | 1.29E+05 | 1.395 |
| 8 | 12 | 100% | 100% | 6.38E+04 | 6.2248 |
| 7 | 20 | 100% | 100% | 6.94E+05 | 4.464 |
| 4 | 21 | 100% | 100% | 2.24E+05 | 8.06 |
| 4 | 17 | 100% | 100% | 2.24E+05 | 1.488 |
| 4 | 29 | 97% | 75% | 6.94E+05 | 1.2834 |
| 12 | 17 | 100% | 92% | 6.94E+05 | 0.4464 |
| 30 | 8 | 25% | 10% | 6.94E+06 | 19.53 |
| 23 | 17 | 0% | 13% | 6.94E+06 | 9.486 |
| 22 | 22 | 41% | 5% | 6.94E+06 | 4.464 |
| 22 | 19 | 89% | 91% | 0.00E+00 | 0 |
| 22 | 19 | 68% | 45% | 6.94E+06 | 1.674 |
| 8 | 29 | 10% | 25% | 6.94E+06 | 13.95 |
| 16 | 29 | 10% | 0% | 6.94E+06 | 5.022 |
| 10 | 29 | 90% | 30% | 2.24E+06 | 2.232 |
| 22 | 24 | 38% | 9% | 2.24E+06 | 6.944 |
| 14 | 23 | 22% | 21% | 2.24E+06 | 14.88 |

It will be seen that each graph includes two regimes: at lower power densities, survival fraction is primarily a function of total energy deposited in the insect's body. At higher power densities, the energy required to kill an insect decreases, and survival fraction is primarily a function of power density. It is believed that this is due to the optical saturation of absorbing molecules (sometimes described as photobleaching) in the insect's exoskeleton and other surface layers, and the consequent penetration of light into interior tissues which are subject to photochemical damage, particularly of active DNA.

The experiments reported in FIG. 5, FIG. 6, and FIG. 7 use 24-hour survival fraction of mosquito population as a figure-of-merit. In some embodiments, it may be sufficient to disable, rather than kill, mosquitoes or other targets, as discussed elsewhere herein. Further, the life cycle of malaria requires a period of approximately 11-14 days between infection of a mosquito and transmission to a human host. Thus, it may be possible to substantially impact malaria rates by achieving a suitably low 10-day survival fraction, which may require different energies or power densities than those shown in the reported data. Finally, it is unknown to what extent anesthetization and handling may affect energies or power densities required to affect mosquitoes. Experiments similar to those reported in FIG. 5, FIG. 6, and FIG. 7 but using the tracking and targeting systems described herein may provide further information about suitable systems for disabling mosquitoes or other pests.

Trap Validation

Systems such as those shown and described herein may be used to measure the efficacy of traps and to identify the most reliable methods of monitoring insect populations. The World Health Organization has published "Dengue: Guidelines For Diagnosis, Treatment, Prevention And Control," a copy of which is included herewith and which is incorporated by reference herein, describing in Section 5.2.2 methods of entomological surveillance of dengue vectors (in particular, *Aedes aegypti*). Current methods include sampling larvae and pupae, pupal/demographic surveys, sampling the adult mosquito population, landing collections, resting collections, sticky trap collections, oviposition traps, and larvitraps. Some of these methods are expensive and involve potential ethical concerns (e.g., landing collections, which may involve human contact with possibly-infected mosquitoes), and it is not well understood how well any of these methods correlate with adult mosquito populations. The present invention will permit inexpensive methods such as sticky traps and larvitraps to be compared with adult populations to determine whether these methods provide adequate measures of mosquito populations.

PROPHETIC EXAMPLE 1

Surveillance of Mosquitoes with a Photonic System Versus an Ovitrap

A photonic system is used to identify and enumerate the number of mosquitoes flying over and around an ovitrap device. The efficacy and accuracy of the photonic system versus the ovitrap device in monitoring the number of mosquitoes infesting a site are compared. The photonic system includes an imager, an illumination source, a retroreflector and a processor to locate and identify mosquitoes. The ovitrap comprises a jar containing water, a mosquito attractant, and wooden paddles to collect and count eggs deposited by females traversing the site. The prevalence of a mosquito vector, Aedes aegypti, is measured using a photonic system and ovitraps.

An oviposition trap (aka ovitrap) is used to detect the presence of mosquitoes and to monitor the density of mosquitoes in a village. Each ovitrap includes a 350 mL cup painted black with seed germination paper covering the inside of the cup, and with approximately 175 mL of hay infusion to attract mosquitoes. Methods and materials to make enhanced ovitraps are described (see e.g., Polson et al., Dengue Bulletin 26: 178-184, 2002 which is incorporated herein by reference). The ovitraps are placed approximately one meter off the ground in a sheltered location to avoid rainfall and sun and left for 48 hours, and then the seed germination paper is removed and sent to a lab for mosquito egg counting which is done manually with the aid of magnification. Species identification requires rearing larvae from the eggs. The ovitrap is reset with fresh germination paper and hay infusion fluid for another 48 hours, and the process is repeated for approximately 4 weeks. To sample a rural village or a city, 50-262 ovitraps may be required (see e.g., Polson et al., Ibid., and Regis et al., PLoS ONE 8: e67682 doi:10.1371/journal.pone.0067682 which are incorporated herein by reference). The surveillance data obtained from the ovitraps may include: The percentage of traps with mosquito eggs present; the number of mosquito eggs per ovitrap and the corresponding locations of the positive traps. For example, ovitraps with hay infusion placed in a village outside of Phnom Penh, Cambodia detected mosquito eggs in 9%-67% of outdoor traps over thirteen trap collections, and a mean number of 4-23 eggs per trap over thirteen collections (see e.g., Polson et al., Ibid.).

The photonic system employs a high speed CMOS camera, a retroreflector screen, an illumination source and a processor to acquire and analyze the images obtained by the system and to determine biological parameters from the mosquito images. For example, the camera may be a Phantom Flex available from Vision Research, Wayne, N.J. which has a variable shutter speed and frame rates exceeding 10,000 frames/second (see e.g., Datasheet for Phantom Flex camera, which is incorporated herein by reference). Image acquisition and image processing software may be provided with the camera or separately. Alternative computer programs to track and record the flight path of flying insects are described (see e.g., Spitzen et al., in Proceedings of Measuring Behavior 2008, Maastricht, The Netherlands, Aug. 26-29, 2008 eds. Spink et al., which is incorporated herein by reference). The photonic system also includes an illumination source and a retroreflector to efficiently reflect light from the light source back to the camera (see FIG. 1). For example a light emitting diode and a reflector surface including retroreflector fabric such as SCOTCHLIGHT™ Silver Industrial Wash Fabric 9910, available from 3M Corp., may be used to backlight insects as they fly across the camera's field of view. Microcircuitry on the device analyzes the image data to identify, locate, and enumerate mosquitoes entering the field of view over a defined period (e.g., 48 hours). For example the identity of a flying insect may be determined by the varying amplitude of a specific wavelength of light reflected from the insect's beating wings as described above. Methods to locate and track mosquitoes in flight based upon computerized analysis of video camera images are described (see e.g., Spitzen et al., Ibid.) Moreover, processing of the video data for mosquitoes allow determination of multiple parameters including species and sex of flying mosquitoes. For example male and female *Aedes aegypti* and *Aedes triseriatus* mosquitoes may be identified and differentiated based on digital recordings of light reflecting off the mosquitoes in flight. Spectral patterns corresponding to wingbeat frequencies may be analyzed to obtain a plot of frequency versus amplitude, and computer methods are used to identify species and sex of closely related mosquito species (see e.g., Moore, J. Insect Behavior, 4(3):391-396 (2005). Robertson, et al., J. Amer. Mosquito Control Assoc., 18(4):316-320 (2002); and "An Automated Flying-Insect Detection System," NASA Technical Briefs, SSC-00192 (2007), available at <www.techbriefs.com/content/view/2187/34/> all of which are incorporated herein by reference). The photonic system is constructed as a rectangular enclosure which is placed directly above an enhanced CDC ovitrap to allow comparison of the two systems for monitoring mosquitoes.

In comparison, the photonic systems placed over each ovitrap monitor the airspace over the trap and detect and record image data for each mosquito, male or female regardless of species and egg-laying status. The imaging data is automatically processed to determine the sex and species, as well as other biological parameters of any and all mosquitoes which fly through the airspace over the ovitrap. Data on the sex, species and numbers of mosquitoes detected at a specific site over a selected period of time (e.g., 48 hours) is transmitted to a centralized computer or database immediately. In contrast to ovitrap systems, the counting and reporting of mosquitoes is automated and dependent on algorithms for image analysis. Moreover, the detection of adult mosquitoes eliminates indirect estimation of gravid females based on egg counting. By comparing the data generated by the ovitrap system with that measured by the photonic system, researchers may gain insight into the accuracy and efficacy of the ovitrap system.

PROPHETIC EXAMPLE 2

Comparison of a Photonic System to Funnel Traps for Measuring Mosquito Infestation in Wells or Water Containers A photonic system is used to identify and enumerate the number of adult mosquitoes flying over and around subterranean wells and water containers. The photonic system is compared to funnel traps for efficacy and accuracy in monitoring the number of mosquitoes infesting a site. The photonic system includes an imager, an illumination source, a retroreflector and a processor to locate, identify and characterize mosquitoes in flight. The funnel trap is a floating trap which catches mosquito larvae as they swim to the surface of the well or water container. Larvae counts are done manually to discriminate mosquito larvae from other insects. The density of *Anopheles* mosquitoes is measured in field tests at subterranean wells with known mosquito infestations using a photonic system versus funnel traps.

Funnel traps are tested in water wells to compare their efficacy and accuracy in monitoring mosquito infestations. Methods and materials to construct and test funnel traps are described (see e.g., Russell et al., *J. Med. Entomol.* 36: 851-855, 1999 which is incorporated herein by reference). For example, a funnel trap is constructed from a plastic container with a plastic funnel inserted in the lid of the container. The container serves as a reservoir to collect mosquito larvae which swim upward through the funnel into the reservoir and are trapped. The funnel trap is approximately 180 mm long and floats with the funnel mouth (185 mm diameter) facing the bottom of the well. Field tests are done on 100 cm diameter wells. A funnel trap is set on each well overnight and mosquito larvae are counted manually after approximately 12 hours. Funnel traps sample approximately 20% of the larvae introduced in a well in a single 12 hour sampling period. In field tests the absolute number of larvae introduced in the traps is predicted with 84-97% accuracy with coefficients of variation between 14-39% when replicate samplings are done. However, single samplings only allow qualitative prediction of low, medium and high densities of larvae. Funnel traps are less efficient at sampling different mosquitoes. For example, *Aedes* larvae are sampled more efficiently than *Culis* larvae (e.g., 1.7-2.3 times more efficient) likely due to differing swimming behavior of the larvae. Also some stages of mosquito development are sampled less efficiently by funnel traps. For example, $1^{st}$ and $2^{nd}$ instar and pupae are trapped at lower efficiency. Funnel trap sampling efficacy also varies with well diameter and thus complicates prediction of larval population size. See e.g., Russel et al., Ibid.

The photonic system includes imagers, illumination sources, retroreflectors and processors to analyze spectral and image data to locate, track, identify and characterize mosquitoes flying into the field of view. A high speed camera, capable of 1,000 frames per second with high resolution, and with variable shutter speeds (see e.g., Datasheet for Phantom Flex camera which is incorporated herein by reference) is used to detect and characterize mosquitoes at different shutter speeds. For example, initial detection and tracking of mosquitoes entering the field of view may be done at approximately 500 frames per second and then imaging of wingbeat frequencies on the targeted mosquito may be done at 5,000 frames/second. Mosquito wingbeat frequencies and associated harmonics may range between 500 and 2000 cycles per second (see e.g., Moore, *J. Insect Behavior,* 4(3):391-396 (1991) which is incorporated herein by reference). The photonic system may include illumination source(s) (e.g., light emitting diodes) and retroreflectors to backlight mosquitoes entering the field of view. The photonic system may be bounded by rectangular or cylindrical supports with imagers, illumination sources, lasers, photodiodes and retroreflectors placed as indicated in FIG. 1. Processors analyze imaging data and spectral data to locate, identify and track mosquitoes entering the field of view (see e.g., Spitzen et al., Ibid.), moreover, processors may initiate programmed changes in the photonic system.

For example, identification of a mosquito based on imaging with the high speed camera at 500 fps may trigger tracking and targeting with a pulsed laser at 1180 nm to detect hemozoin indicative of malarial infection. The system may also estimate malarial status on the basis of mosquito behavior, such as changes in flight paths, speed, host-seeking behavior, altitude, or time of day of mosquito activity. See, e.g., Cator et al., *Trends in Parasitol.* 28(11): 466-470 (2012), Lacroix et al., *PLOS Biol.* 3(9):1590-1593 (2005), Smallegange et al., *PLoS ONE* 8(5):1-3 (May 2013), all of which are incorporated herein by reference. The photonic system may be implemented with a rectangular boundary and installed immediately above water wells containing funnel traps.

Photonic systems are installed over approximately 12 wells containing 1 funnel trap each. The photonic systems monitor the airspace over the wells and automatically report the number, species, sex, and probable parasite status (e.g., *Plasmodium* positive or negative) of mosquitoes that enter the field of view. For example, over a period of 48 hours emergent mosquitoes from the well and all other mosquitoes flying into the field of view are counted and characterized. The data are automatically transmitted to a central computer for analysis, e.g., comparison to funnel trap data. After 48 hours the funnel traps are retrieved from the wells and mosquito larvae are visually identified and counted. The data are manually entered into a computer and compared to the number of mosquitoes flying over the corresponding wells. The correlation coefficient for the number of mosquito larvae and the number of flying mosquitoes detected in the wells is calculated. A photonic system may provide increased accuracy relative to a funnel trap since the determination of mosquito species, sex and other characteristics confirms the identification; also the continuous surveillance of the airspace over the well is preferable to the coverage of funnel filters (e.g., 2.4% of a 1.2 m diameter well). Moreover the photonic system is not subject to the variation in behavior of different mosquito species (e.g., *Aedes, Culis, Anopheles*) and different larval stages (e.g., see above and Russel et al., Ibid.) which complicate the funnel trap system. Finally, the identification of flying mosquitoes infected with a malaria agent, *Plasmodium,* is important information obtained with a photonic system that is not available from analysis of mosquito larvae.

PROPHETIC EXAMPLE 3

Comparison of a Photonic Detection System with a Human Landing Collection Method to Monitor Mosquitoes A photonic system is compared to a human landing catch (HLC) method to monitor mosquito density in an African village. The photonic system is constructed to detect, count and characterize any mosquitoes crossing a perimeter established around selected houses in the village. Individuals in each house are trained to sample host seeking mosquitoes using a HLC method. The sensitivity and efficacy of each method for monitoring multiple species of mosquito is compared.

The photonic system is constructed to image mosquitoes in flight and process the imaging data to identify, enumerate, and characterize the mosquitoes and to report information on the mosquitoes to a system computer. The photonic system is set up to monitor a perimeter surrounding each of three houses selected for the study. Support posts approximately 20 cm×20 cm×500 cm high are set approximately 100 m apart to define a perimeter around each house (see FIG. 2). Two high speed cameras (see e.g., Datasheet for Phantom Flex camera, which is incorporated herein by reference) are placed facing each other on each side of the perimeter to create a photonic fence. The fields of view on each side of the perimeter are approximately 500 cm high, 100 m long and 20 cm thick. Each support post is covered with retroreflective fabric (such as SCOTCHLITE™ 9100 from 3M Corp. in St. Paul, Minn.) to provide backlighting to any mosquitoes crossing the field of view, i.e., the photonic fence. The photonic system may also have a laser light source and a photon detector incorporated on each side of the perimeter. For example, a Ti:Sapphire laser producing laser pulses at 1180 nm and a photon detection system may be used to detect hemozoin, a pigment associated with malarial parasites, e.g., *Plasmodium* (see e.g., Belisle et al., *Biophys J.* 94(4): L26-L28, Feb. 15, 2008; doi: 10.1529/biophysj.107.125443 which is incorporated herein by reference). The photonic system established on the perimeter also includes processors, circuitry and programming to identify, locate, count and determine biological properties of mosquitoes which cross the perimeter. For example spectral patterns corresponding to wingbeat frequencies may be analyzed to obtain a plot of frequency versus amplitude, and computer methods are used to identify species and sex of closely related mosquito species (see e.g., Moore, *J. Insect Behavior*, 4(3):391-396 (2005). Robertson, et al., *J. Amer. Mosquito Control Assoc.*, 18(4):316-320 (2002); and "An Automated Flying-Insect Detection System," NASA Technical Briefs, SSC-00192 (2007), available at <www.techbriefs.com/content/view/2187/34/> all of which are incorporated herein by reference). Detailed information on all mosquitoes crossing the photonic fence is automatically transmitted to a central computer in real time to create a record of mosquitoes observed every 12 hours (between 7 pm and 7 am) for 7 days or longer. Importantly, information on the number, species, sex, feeding status, malarial infection and mating status of the mosquitoes is reported.

A human landing catch (HLC) method is established at each of the houses with a photonic fence system and the data on mosquitoes detected by both systems is compared. To collect HLC data an adult male collector exposes his lower limbs and collects mosquitoes when they land on his legs with an aspirator. The catcher collects mosquitoes for 45 minutes/hour and rests for 15 minutes. Mosquito collections are done nightly between 7 pm and 7 am for 7 days or longer. The HLC catcher collects at an indoor site and an outdoor site within the perimeter of the photonic fence. Aspirated mosquitoes are processed to identify sex and species by morphology with a dissecting microscope. Abdominal status is classified as fed, unfed, gravid or partly gravid. For example, male and female *Anopheles* are sorted, and females are analyzed for malarial (circumsporozite) proteins using an ELISA assay. Also polymerase chain reaction (PCR) is used to identify mosquito subspecies. Methods and materials to conduct HLC, aspirate and process mosquitoes are described (see e.g., Sikaala et al., *Parasites and Vectors* 6:91, 2013 online at: <www.parasitesandvectors.com/content/6/1/91> which is incorporated herein by reference). Data on mosquitoes collected with HLC for 12 hours each night over 7 days is entered into a centralized computer and compared to photonic fence data collected over the same time frame.

The HLC method and the photonic fence are compared with respect to: the absolute number of mosquitoes detected for each species, the number of female mosquitoes, the number of infected mosquitoes (*Plasmodium*), the number of fed vs. unfed mosquitoes, and the mating status of the female mosquitoes. The efficacy and accuracy of the photonic system versus the HLC may depend on the diligence and stamina of the HLC catchers who collect 12 hours per night for 7 days or more. Also the risk of infection by *Plasmodium* and other vector-borne diseases is a major drawback of HLC.

In a general sense, those skilled in the art will recognize that the various aspects described herein which can be implemented, individually or collectively, by a wide range of hardware, software, firmware, or any combination thereof can be viewed as being composed of various types of "electrical circuitry." Consequently, as used herein, "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes or devices described herein, or a microprocessor configured by a computer program which at least partially carries out processes or devices described herein), electrical circuitry forming a memory device (e.g., forms of memory (e.g., random access, flash, read only, etc.)), or electrical circuitry forming a communications device (e.g., a modem, communications switch, optical-electrical equipment, etc.). Those having skill in the art will recognize that the subject matter described herein may be implemented in an analog or digital fashion or some combination thereof.

Those skilled in the art will recognize that at least a portion of the devices or processes described herein can be integrated into an image processing system. Those having skill in the art will recognize that a typical image processing system generally includes one or more of a system unit housing, a video display device, memory such as volatile or non-volatile memory, processors such as microprocessors or digital signal processors, computational entities such as operating systems, drivers, applications programs, one or more interaction devices (e.g., a touch pad, a touch screen, an antenna, etc.), control systems including feedback loops and control motors (e.g., feedback for sensing lens position or velocity; control motors for moving/distorting lenses to give desired focuses). An image processing system may be implemented utilizing suitable commercially available components, such as those typically found in digital still systems or digital motion systems.

Those skilled in the art will recognize that at least a portion of the devices or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), or control systems including feedback loops and control motors (e.g., feedback for sensing position or velocity; control motors for moving or adjusting components or quantities). A data processing system may be implemented utilizing suitable commercially available components, such as those typically found in data computing/communication or network computing/communication systems.

In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media hold or transmit device-detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or invoking circuitry for enabling, triggering, coordinating, requesting, or otherwise causing one or more occurrences of virtually any functional operations described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available or techniques in the art, may be compiled/implemented/translated/converted into a high-level descriptor language (e.g., initially implementing described technologies in C or C++ programming language and thereafter converting the programming language implementation into a logic-synthesizable language implementation, a hardware description language implementation, a hardware design simulation implementation, or other such similar mode(s) of expression). For example, some or all of a logical expression (e.g., computer programming language implementation) may be manifested as a Verilog-type hardware description (e.g., via Hardware Description Language (HDL) or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital or an analog communication medium (e.g., a fiber optic cable, a waveguide, a wired communications link, a wireless communication link (e.g., transmitter, receiver, transmission logic, reception logic, etc.), etc.).

It will be understood that, in general, terms used herein, and especially in the appended claims, are generally intended as "open" terms (e.g., the term "including" should be interpreted as "including but not limited to," the term "having" should be interpreted as "having at least," the term "includes" should be interpreted as "includes but is not limited to," etc.). It will be further understood that if a specific number of an introduced claim recitation is intended, such an intent will be explicitly recited in the claim, and in the absence of such recitation no such intent is present. For example, as an aid to understanding, the following appended claims may contain usage of introductory phrases such as "at least one" or "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "an imager" should typically be interpreted to mean "at least one imager"); the same holds true for the use of definite articles used to introduce claim recitations. In addition, even if a specific number of an introduced claim recitation is explicitly recited, it will be recognized that such recitation should typically be interpreted to mean at least the recited number (e.g., the bare recitation of "two images," or "a plurality of images," without other modifiers, typically means at least two images). Furthermore, in those instances where a phrase such as "at least one of A, B, and C," "at least one of A, B, or C," or "an [item] selected from the group consisting of A, B, and C," is used, in general such a construction is intended to be disjunctive (e.g., any of these phrases would include but not be limited to systems that have A alone, B alone, C alone, A and B together, A and C together, B and C together, or A, B, and C together, and may further include more than one of A, B, or C, such as $A_1$, $A_2$, and C together, A, $B_1$, $B_2$, $C_1$, and $C_2$ together, or $B_1$ and $B_2$ together). It will be further understood that virtually any disjunctive word or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A system for tracking airborne organisms, the system comprising:
    a physical trap configured to physically capture at least one airborne organism;
    a detection component configured to identify a biological property of a captured airborne organism, wherein the detection component includes:
        an imager having an image resolution and a field of view;
        a backlight source configured to be placed in the field of view of the imager; and
        a processor configured to analyze one or more images captured by the imager including at least a portion of the backlight source, the processor being configured to identify a the biological property of the captured airborne organism in the field of view of the imager, and the processor being further configured to determine a rate of revolution for the captured airborne organism; and
    a notification component configured to send a notification to a remote user in response to the identified biological property and the rate of revolution of the captured airborne organism.

2. The system of claim 1, wherein the notification component is configured to send a notification including the identified biological property of the captured airborne organism.

3. The system of claim 1, wherein the identified biological property of the captured airborne organism includes at least one of genus, species, sex, mating status, gravity, feeding status, age, or health status.

4. The system of claim 1, wherein the captured airborne organism includes an insect.

5. The system of claim 1, wherein the captured airborne organism includes a mosquito.

6. The system of claim 1, wherein the captured airborne organism includes a psyllid.

7. The system of claim 1, wherein the backlight source includes a retroreflector.

8. The system of claim 1, wherein the backlight source is a retroreflector.

* * * * *